(12) United States Patent
Li et al.

(10) Patent No.: US 9,926,443 B2
(45) Date of Patent: Mar. 27, 2018

(54) PROPYLENE-BASED ELASTOMERS FOR ROOFING COMPOSITIONS AND METHODS FOR PREPARING THE SAME

(71) Applicant: ExxonMobil Chemical Patents Inc., Baytown, TX (US)

(72) Inventors: Liang Li, Shanghai (CN); Felix M. Zacarias, Houston, TX (US); Narayanaswami Dharmarajan, Houston, TX (US); Jan Kalfus, Spring, TX (US); Patrick Brant, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/259,750

(22) Filed: Sep. 8, 2016

(65) Prior Publication Data

US 2017/0130041 A1    May 11, 2017

Related U.S. Application Data

(60) Provisional application No. 62/252,864, filed on Nov. 9, 2015.

(51) Int. Cl.
  *C08L 23/16*    (2006.01)

(52) U.S. Cl.
  CPC .......... *C08L 23/16* (2013.01); *C08L 2201/02* (2013.01); *C08L 2205/025* (2013.01); *C08L 2205/03* (2013.01); *C08L 2207/04* (2013.01); *C08L 2310/00* (2013.01)

(58) Field of Classification Search
  CPC .. C08L 23/16; C08L 2207/04; C08L 2201/02; C08L 2205/025; C08L 2205/03; C08L 2310/00
  USPC ....................................................... 524/528
  See application file for complete search history.

(56) References Cited

U.S. PATENT DOCUMENTS

| | | | |
|---|---|---|---|
| 6,500,563 B1 * | 12/2002 | Datta | B32B 25/08 428/517 |
| 6,525,157 B2 | 2/2003 | Cozewith et al. | |
| 6,750,284 B1 | 6/2004 | Dharmarajan et al. | |
| 6,881,800 B2 | 4/2005 | Friedersdorf | |
| 6,953,828 B2 * | 10/2005 | Dharmarajan | C08L 23/0815 525/191 |
| 7,666,491 B2 * | 2/2010 | Yang | C08J 5/2231 428/141 |
| 7,803,876 B2 | 9/2010 | Yeh et al. | |
| 8,013,069 B2 | 9/2011 | Harrington et al. | |
| 8,026,323 B2 | 9/2011 | Datta et al. | |
| 2007/0208139 A1 * | 9/2007 | Raulie | C08J 5/18 525/240 |
| 2007/0277450 A1 | 12/2007 | Raulie | |

FOREIGN PATENT DOCUMENTS

| | | | |
|---|---|---|---|
| WO | 99/45041 | 9/1999 | |
| WO | 2006/023117 | 3/2006 | |
| WO | 2010/115079 | 10/2010 | |
| WO | 2011/087729 | 7/2011 | |
| WO | 2011/087730 | 7/2011 | |
| WO | 2011/087731 | 7/2011 | |
| WO | 2014/001224 | 1/2014 | |
| WO | 2014/040914 | 3/2014 | |
| WO | WO 2015012948 A1 * | 1/2015 | ............... C08J 5/18 |

OTHER PUBLICATIONS

U.S. Appl. No. 62/121,230, filed Feb. 26, 2015, Zacarias et al.
Cheng, "C NMR Analysis of Ethylene-Propylene Rubbers," Macromolecules, 1984, vol. 17, pp. 1950-1955.
Cheung et al., "Structure-Property Relationships and Applications of Novel Flexible TPO Based on Blends of Developmental Performance Elastomer and Polypropylene," ANTEC 2004, pp. 2600-2605.
Wheeler et al., "Gel Permeation Chromatography/Fourier Transform Infrared Interface for Polymer Analysis," Applied Spectroscopy, vol. 47, No. 9, 1993, pp. 1128-1130.

\* cited by examiner

*Primary Examiner* — Michael M Bernshteyn

(57) ABSTRACT

Provided herein are membranes including a blend of a propylene-based elastomer and an ethylene copolymer, a thermoplastic resin, a flame retardant, and an ultraviolet stabilizer.

19 Claims, 5 Drawing Sheets

PROPYLENE-BASED ELASTOMERS FOR ROOFING COMPOSITIONS AND METHODS FOR PREPARING THE SAME

CROSS-REFERENCE TO RELATED APPLICATION

The present application claims priority to U.S. Ser. No. 62/252,864, filed Nov. 9, 2015, which is herein incorporated by reference.

FIELD OF THE INVENTION

Described herein are formulations comprising blends of propylene-based elastomers and ethylene copolymers which are useful in roofing applications, such as thermoplastic roofing applications.

BACKGROUND OF THE INVENTION

Compositions and membranes comprising thermoplastic olefin (TPO) polymers have found widespread use in the roofing industry for commercial buildings. TPO membranes are often fabricated as a composite structure containing a reflective membrane (40 to 60 mils thick), a reinforcing polyester scrim fabric (1 to 2 mils thick), and a pigmented layer (40 to 60 mils thick). When the membrane is applied to the roof, the reflective white layer is exposed to sunlight while the pigmented layer (which is underneath the reflective layer) is attached to the roof insulation material.

For roofing and other sheeting applications, the products are typically manufactured as membrane sheets having a typical width of 10 feet (3 meters) or greater, although smaller widths may be available. The sheets are typically sold, transported, and stored in rolls. For roofing membrane applications, several sheets are unrolled at the installation site, placed adjacent to each other with an overlapping edge to cover the roof and are sealed together by a heat welding process during installation. During transport and storage, the rolls can be exposed to extreme heat conditions, such as from 40° C. to 100° C., which can lead to roll blocking of the rolls during storage in ware-house. After installation, the membranes can be exposed during service to a wide range of conditions that may deteriorate or destroy the integrity of the membrane. As such, a membrane is desired that can withstand a wide variety of service temperatures, such as from −40° C. to 40° C.

PCT Publication No. WO 2010/115079A1 is directed to roofing membranes that contain compositions of Formula I that comprises (a) 30 to 50 wt % of a propylene-based elastomer, (b) 9 to 20 wt % of a plastomer, (c) from 7 to 20 wt % of an impact polypropylene-ethylene copolymer, (d) 20 to 35 wt % of magnesium hydroxide, (e) 5 to 10 wt % of titanium dioxide, and (f) 1 to 2 wt % of additives; or compositions of Formula II that comprises (a) 32 to 48 wt % of a propylene-based elastomer, (b) 9 to 18 wt % of a plastomer, (c) 7 to 20 wt % of an impact polypropylene-ethylene copolymer, (d) 25 to 35 wt % of magnesium hydroxide, (e) 4 to 6 wt % of titanium dioxide, (f) 0.75 to 1.5 wt % of UV inhibitor, (g) 0.2 to 0.45 wt % of antioxidant/stabilizer, (h) 0.15 to 0.4 wt % of thermal stabilizer, and (i) 0.1 to 0.2 wt % of lubricant. The propylene-based elastomer used in WO 2010/115079A1 was Vistamaxx™ 6102 and the lubricant used was Asahi AX71 which is a mono or distearyl acid phosphate. The roofing membrane in WO 2010/115079A1 is formed around a scrim having reinforcing polyester threads.

PCT Publication No. WO 2014/001224A1 is directed to compositions comprising 40 to 75 wt % of at least one polypropylene-based elastomer and around 25 to 60 wt % of at least one random copolymer of polypropylene. The polypropylene-based elastomers used in WO 2014/001224A1 were Vistamaxx™ 3980, 6102, and 6202.

PCT Publication No. WO 2014/040914A1 is directed to thermoplastic mixtures that comprise at least one impact-resistant polypropylene copolymer and at least one ethylene-1-octene copolymer, where the weight ratio of impact-resistant polypropylene copolymer to ethylene-1-octene copolymer is in the range of 35:65 to 65:35.

U.S. Patent Ser. No. 62/121,230, filed on Feb. 26, 2015, is directed to a roofing membrane composition of a 10-50 wt % of a propylene-based elastomer, 5-40 wt % of a thermoplastic resin, at least one flame retardant, and at least one ultraviolet stabilizer.

There still remains a need for roofing membranes that demonstrate flexibility at service temperatures from −40° C. to 40° C. and resistance to roll blocking at elevated temperatures.

SUMMARY OF THE INVENTION

Figure 1:
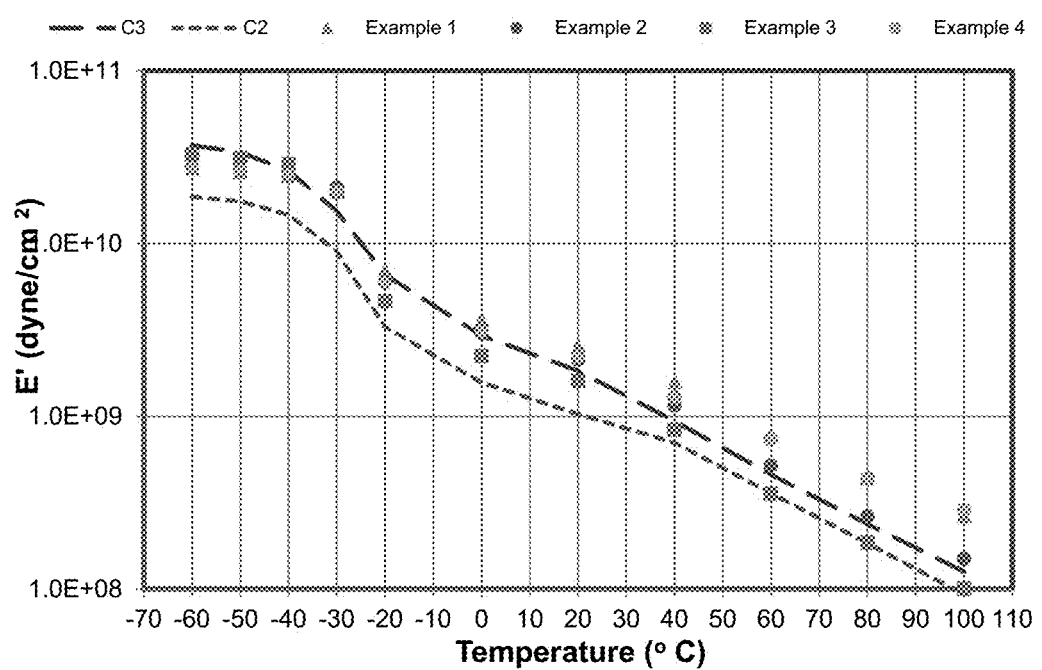
FIG. 1 illustrates the storage modulus (E') of Samples C2, C3, 1, 2, 3 and 4.

Provided here is a reactor blend composition comprising from about 70 wt % to about 95 wt % of a propylene-based elastomer, wherein the propylene-based polymer elastomer has an ethylene content of about 15 wt % to about 30 wt % based upon the weight of the propylene-based elastomer, and from about 5 wt % to about 30 wt % of an ethylene copolymer, where the ethylene-copolymer has an ethylene content of greater than or equal to about 70 wt % based upon the weight of the ethylene copolymer.

Provided herein are membranes that comprise a blend composition of (a) from about 20 wt % to about 50 wt % of a polymer blend, comprising (i) from about 70 wt % to about 95 wt % of a propylene-based elastomer, wherein the propylene-based polymer elastomer has an ethylene content of about 15 wt % to about 30 wt % based upon the weight of the propylene-based elastomer, and (ii) from about 5 wt % to about 30 wt % of an ethylene copolymer, where the ethylene-copolymer has an ethylene content of greater than or equal to about 70 wt % based upon the weight of the ethylene copolymer; (b) from about 5 wt % to about 30 wt % of a thermoplastic resin based on the composition; (c) at least one flame retardant; and (d) at least one ultraviolet stabilizer.

DETAILED DESCRIPTION OF THE INVENTION

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

Described herein are compositions comprising propylene-based elastomers that are suitable for roofing applications, particularly roofing membranes. In preferred embodiments, the compositions comprise a propylene-based elastomer that is a reactor-blended polymer as described herein. In preferred embodiments, the compositions further comprise a polyalphaolefin. The compositions provide a balance of properties over a wide range of temperatures. For example, the compositions exhibit flexibility at temperatures from −40° C. to 40° C. and improved properties at elevated temperatures.

All numerical values within the detailed description and the claims herein are modified by "about" or "approximately" the indicated value, and take into account experimental error and variations that would be expected by a person having ordinary skill in the art.

As used herein, the term "copolymer" is meant to include polymers having two or more monomers, optionally, with other monomers, and may refer to interpolymers, terpolymers, etc. The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations may include isotactic, syndiotactic and atactic symmetries. The term "blend" as used herein refers to a mixture of two or more polymers. The term "elastomer" shall mean any polymer exhibiting some degree of elasticity, where elasticity is the ability of a material that has been deformed by a force (such as by stretching) to return at least partially to its original dimensions once the force has been removed.

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit". Different monomers are discussed herein, including propylene monomers, ethylene monomers, and diene monomers.

"Reactor grade," as used herein, means a polymer that has not been chemically or mechanically treated or blended after polymerization in an effort to alter the polymer's average molecular weight, molecular weight distribution, or viscosity. Particularly excluded from those polymers described as reactor grade are those that have been visbroken or otherwise treated or coated with peroxide or other prodegradants. For the purposes of this disclosure, however, reactor grade polymers include those polymers that are reactor blends.

"Reactor blend," as used herein, means a highly dispersed and mechanically inseparable blend of two or more polymers produced in situ as the result of sequential or parallel polymerization of one or more monomers with the formation of one polymer in the presence of another, or by solution blending polymers made separately in parallel reactors. Reactor blends may be produced in a single reactor, a series of reactors, or parallel reactors and are reactor grade blends. Reactor blends may be produced by any polymerization method, including batch, semi-continuous, or continuous systems. Particularly excluded from "reactor blend" polymers are blends of two or more polymers in which the polymers are blended ex situ, such as by physically or mechanically blending in a mixer, extruder, or other similar device.

Polymer Blend

The polymer blend of the roofing membrane composition includes the propylene-based elastomer and the ethylene copolymer. In an embodiment, the polymer blend is a reactor blend of the propylene-based elastomer and the ethylene copolymer.

"Reactor blend" herein distinguished from a "physical blend," the latter being the combination of two or more polymers that have already been formed and recovered before being mixed or otherwise combined, e.g., separated (which would preferably also include being devolatilized) from some or all of the remaining polymerization mixture (e.g., unreacted monomers and/or solvent) and then combined together.

The term "reactor blend" does not preclude (except to the extent stated otherwise) two components that have reacted to some extent or degree with one another, e.g., where one is a reaction product that is derived from the other, in whole or in part. Nor does the term "reactor blend" preclude two components that are mixed together but that can be separated by conventional means (e.g., fractionation) following formation and therefore can be identified as distinct polymers, e.g., a semicrystalline polymer having a distinct melting point (Tm) and an atactic or amorphous ethylene elastomer having either a low melting point (Tm) or no melting point.

The term "reactor blend" used herein may in certain embodiments refer to a homogenous (e.g., a single phase) material while in other embodiments it may refer to a multiphase blend (e.g., two or more distinct phases). A blend formed by melt-blending is a physical blend.

The reactor blend compositions preferably include at least a propylene polymer and an ethylene polymer, although the ethylene polymer is in some cases identifiable by inference and/or by fractionation. In certain embodiments, the reactor blend includes a major portion by weight (more than 50 wt. %) propylene-based elastomer with a minor portion (less than 50 wt. %) ethylene copolymer.

In certain embodiments of the reactor blend, the first polymer and second polymer form a substantially homogenous reactor blend, meaning that the first polymer and second polymer are part of, or are within, or occupy, the same phase. In this case the first and the second polymer components are thermodynamically miscible. In other embodiments of the reactor blend, the first polymer and second polymer form distinct phases of a multiphase composition. In certain multiphase embodiments, a reactor blend includes a continuous phase (either the first polymer or the second polymer), which may be a dispersed phase (dispersion) and a discontinuous phase (either the first polymer or the second polymer), which may be a matrix phase. In those embodiments, either the continuous phase or the dispersed phase may represent a major portion of the reactor blend and the two polymers are thermodynamically immiscible. Also, at least one embodiment of the reactor blend is a multiphase composition having a continuous phase that includes first polymer as a minor portion of the reactor blend and a dispersed phase that includes second polymer as a major portion. Further, in any of the above embodiments, the second polymer can be crosslinked. The various polysplit, the proportion of one polymer as a fraction of the total polymer, ranges identified above may be used.

Multistage Polymerization

The polymer blends, comprising a reactor blend of the propylene-based elastomer and the ethylene copolymer, are formed in either batch or continuous "multistage polymerization," meaning that two (or more) different polymerizations (or polymerization stages) are conducted. More specifically, a multistage polymerization may involve either two or more sequential polymerizations (also referred to herein as a "series process" two or more parallel polymerizations (also referred to herein as a "parallel process"). Preferably, the polymerization is conducted in a parallel process.

The polymers made in the respective reactors of the continuous, multiple reactor solution plant are blended when in solution without prior isolation from the solvent. The blends may be the result of series reactor operation, where the effluent of a first reactor enters a second reactor and where the effluent of the second reactor can be submitted to finishing steps involving devolatilization. In this case, polymer chains that are created in the first reactor can further grow or be terminated in the second reactor. The blend may also be the result of parallel reactor operation where the effluents of both reactors are combined and submitted to finishing steps. Here, the polymerization is complete in both reactors prior to the combination of the effluent streams. Either option provides an intimate admixture of the polymers in the devolatilized blend. Either case permits a wide variety of polysplits to be prepared whereby the proportion of the amounts of polymers produced in the respective reactors can be varied widely.

The propylene-based elastomer and the ethylene copolymer making up the reactor blend composition are discussed below, followed by a section on the parallel process.

Propylene-Based Elastomer

The polymer blend described herein comprise one or more propylene-based elastomers ("PBEs"). The PBE comprises propylene and from about 5 to about 30 wt % of one or more comonomers selected from ethylene and/or $C_4$-$C_{12}$ α-olefins, and, optionally, one or more dienes. For example, the comonomer units may be derived from ethylene, butene, pentene, hexene, 4-methyl-1-pentene, octene, or decene. In preferred embodiments the comonomer is ethylene. In some embodiments, the propylene-based elastomer composition consists essentially of propylene and ethylene derived units, or consists only of propylene and ethylene derived units. Some of the embodiments described below are discussed with reference to ethylene as the comonomer, but the embodiments are equally applicable to other copolymers with other higher α-olefin comonomers. In this regard, the copolymers may simply be referred to as PBEs with reference to ethylene as the α-olefin.

The PBE may include at least about 5 wt %, at least about 7 wt %, at least about 9 wt %, at least about 10 wt %, at least about 12 wt %, at least about 13 wt %, at least about 14 wt %, at least about 15 wt %, or at least about 16 wt %, α-olefin-derived units, based upon the total weight of the PBE. The PBE may include up to about 30 wt %, up to about 25 wt %, up to about 22 wt %, up to about 20 wt %, up to about 19 wt %, up to about 18 wt %, or up to about 17 wt %, α-olefin-derived units, based upon the total weight of the PBE. In some embodiments, the PBE may comprise from about 5 to about 30 wt %, from about 6 to about 25 wt %, from about 7 wt % to about 20 wt %, from about 10 to about 19 wt %, from about 12 wt % to about 19 wt %, or from about 15 wt % to about 18 wt %, or form about 16 wt % to about 18 wt %, α-olefin-derived units, based upon the total weight of the PBE.

The PBE may include at least about 70 wt %, at least about 75 wt %, at least about 78 wt %, at least about 80 wt %, at least about 81 wt %, at least about 82 wt %, or at least 83 wt %, propylene-derived units, based upon the total weight of the PBE. The PBE may include up to about 95 wt %, up to about 93 wt %, up to about 91 wt %, up to about 90 wt %, up to about 88 wt %, or up to about 87 wt %, or up to about 86 wt %, or up to about 85 wt %, or up to about 84 wt %, propylene-derived units, based upon the total weight of the PBE.

The PBEs of can be characterized by a melting point (Tm), which can be determined by differential scanning calorimetry (DSC). Using the DSC test method described herein, the melting point is the temperature recorded corresponding to the greatest heat absorption within the range of melting temperature of the sample, when the sample is continuously heated at a programmed rate. When a single melting peak is observed, that peak is deemed to be the "melting point." When multiple peaks are observed (e.g., principle and secondary peaks), then the melting point is deemed to be the highest of those peaks. It is noted that due to the low-crystallinity of many PBEs, the melting point peak may be at a low temperature and be relatively flat, making it difficult to determine the precise peak location. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

The Tm of the PBE (as determined by DSC) may be less than about 120° C., less than about 115° C., less than about 110° C., less than about 105° C., less than about 100° C., less than about 90° C., less than about 80° C., less than about 70° C., less than about 65° C., or less than about 60° C. In some embodiments, the PBE may have a Tm of from about 20 to about 110° C., from about 30 to about 110° C., from about 40 to about 110° C., or from about 50 to about 105° C., where desirable ranges may include ranges from any lower limit to any upper limit. In some embodiments, the PBE may have a Tm of from about 40 to about 70° C., or from about 45 to about 65° C., or from about 50 to about 60° C., where desirable ranges may include ranges from any lower limit to any upper limit. In some embodiments, the PBE may have a Tm of from about 80 to about 110° C., or from about 85 to about 110° C., or from about 90 to about 105° C., where desirable ranges may include ranges from any lower limit to any upper limit.

The PBE can be characterized by its heat of fusion (Hf), as determined by DSC. The PBE may have an Hf that is at least about 0.5 J/g, at least about 1.0 J/g, at least about 1.5 J/g, at least about 3.0 J/g, at least about 5.0 J/g, at least about 7.0 J/g, at least about 10.0 J/g, or at least about 12 J/g. The PBE may be characterized by an Hf of less than about 75 J/g, less than about 65 J/g, at less than about 60 J/g, less than about 55 J/g, less than about 50 J/g, less than about 40 J/g, less than about 35 J/g, less than about 30 J/g, less than about 25 J/g, less than about 20 J/g, less than about 17 J/g, or less than 15 J/g. In some embodiments, the PBE may have a Hf of from about 1.0 to about 40 J/g, from about 3.0 to about 30 J/g, or from about 5.0 to about 20 J/g, where desirable ranges may include ranges from any lower limit to any upper limit. In some embodiments, the PBE may have a Hf of from about 1.0 to about 15 J/g or from about 3.0 to about 10 J/g, where desirable ranges may include ranges from any lower limit to any upper limit. In some embodiments, the PBE may have a Hf of from 5.0 to about 30 J/g, from about 7.0 to about 25 J/g, or from about 12 to about 20 J/g, where desirable ranges may include ranges from any lower limit to any upper limit.

As used herein, DSC procedures for determining Tm and Hf are as follows. The polymer is pressed at a temperature of from about 200° C. to about 230° C. in a heated press, and the resulting polymer sheet is annealed, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −30° C. to about −50° C. and held for 10 minutes at that temperature. The sample is then heated at 10° C./min to attain a final temperature of about 200° C. The sample is kept at 200° C. for 5 minutes. Then a second cool-heat cycle is performed, where the sample is cooled to about −30° C. to about −50° C. and held for 10 minutes at that temperature, and then re-heated at 10° C./min to a final temperature of about 200° C. Events from both cycles are recorded. The thermal output is recorded as the area under the melting peak of the sample, which typically occurs between about 0° C. and about 200° C. It is measured in Joules and is a measure of the Hf of the polymer.

Preferably, the PBE has crystalline regions interrupted by non-crystalline regions. The non-crystalline regions can result from regions of non-crystallizable propylene segments, the inclusion of comonomer units, or both. In one or more embodiments, the PBE has a propylene-derived crystallinity that is isotactic, syndiotactic, or a combination thereof. In a preferred embodiment, the PBE has isotactic sequences. The presence of isotactic sequences can be determined by NMR measurements showing two or more propylene derived units arranged isotactically. Such isotactic sequences can, in some cases be interrupted by propylene units that are not isotactically arranged or by other monomers that otherwise disturb the crystallinity derived from the isotactic sequences. In addition to differences in tacticity, the PBE polymer can also have defect structures that are regio-specific.

The PBE can have a triad tacticity of three propylene units (mmm tacticity), as measured by 13C NMR, of 75% or greater, 80% or greater, 85% or greater, 90% or greater, 92% or greater, 95% or greater, or 97% or greater. In one or more embodiments, the triad tacticity may range from about 75 to about 99%, from about 80 to about 99%, from about 85 to about 99%, from about 90 to about 99%, from about 90 to about 97%, or from about 80 to about 97%. Triad tacticity is determined by the methods described in U.S. Pat. No. 7,232,871.

The PBE may have a tacticity index m/r ranging from a lower limit of 4 or 6 to an upper limit of 8 or 10 or 12. The tacticity index, expressed herein as "m/r", is determined by $^{13}$C nuclear magnetic resonance ("NMR"). The tacticity index, m/r, is calculated as defined by H. N. Cheng in Vol. 17, MACROMOLECULES, pp. 1950-1955 (1984), incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 describes an atactic material. An isotactic material theoretically may have a ratio approaching infinity, and many by-product atactic polymers have sufficient isotactic content to result in ratios of greater than 50.

The PBE may have a percent crystallinity of from about 0.5% to about 40%, from about 1% to about 30%, or from about 5% to about 25%, determined according to DSC procedures, where desirable ranges may include ranges from any lower limit to any upper limit. Crystallinity may be determined by dividing the Hf of a sample by the Hf of a 100% crystalline polymer, which is assumed to be 189 J/g for isotactic polypropylene.

The comonomer content and sequence distribution of the polymers can be measured using $^{13}$C nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis. Reference is made to U.S. Pat. No. 6,525,157 which contains more details on GPC measurements, the determination of ethylene content by NMR and the DSC measurements.

The PBE may have a density of from about 0.84 g/cm$^3$ to about 0.92 g/cm$^3$, from about 0.85 g/cm$^3$ to about 0.90 g/cm$^3$, or from about 0.85 g/cm$^3$ to about 0.87 g/cm$^3$ at room temperature, as measured per the ASTM D-1505 test method, where desirable ranges may include ranges from any lower limit to any upper limit.

The PBE can have a melt index (MI) (ASTM D-1238, 2.16 kg@190° C.), of less than or equal to about 10 g/10 min, less than or equal to about 8.0 g/10 min, less than or equal to about 5.0 g/10 min, or less than or equal to about 3.0 g/10 min, or less than or equal to about 2.0 g/10 min. In some embodiments, the PBE may have a MI of from about 0.5 to about 3.0 g/10 min, or from 0.75 to about 2.0 g/10 min, where desirable ranges may include ranges from any lower limit to any upper limit.

The PBE may have a melt flow rate (MFR), as measured according to ASTM D-1238 (2.16 kg weight@230° C.), greater than about 0.5 g/10 min, greater than about 1.0 g/10 min, greater than about 1.5 g/10 min, greater than about 2.0 g/10 min, or greater than about 2.5 g/10 min. The PBE may have an MFR less than about 25 g/10 min, less than about 15 g/10 min, less than about 10 g/10 min, less than about 7 g/10 min, or less than about 5 g/10 min. In some embodiments, the PBE may have an MFR from about 0.5 to about 10 g/10 min, from about 1.0 to about 7 g/10 min, or from about 1.5 to about 5 g/10 min, where desirable ranges may include ranges from any lower limit to any upper limit.

The PBE may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the polymer and $\eta_l$ is the intrinsic viscosity of a linear polymer of the same viscosity-averaged molecular weight (Mv) as the polymer. $\eta_l = KMv^\alpha$, K and $\alpha$ are measured values for linear polymers and should be obtained on the same instrument as the one used for the g' index measurement.

The PBE may have a weight average molecular weight (Mw), as measured by MALLS, of from about 100,000 to about 500,000 g/mol, from about 125,000 to about 400,000 g/mol, from about 150,000 to about 350,000 g/mol, from about 200,000 to about 300,000 g/mol, or from about 210,000 to about 250,000 g/mol, where desirable ranges may include ranges from any lower limit to any upper limit. In some embodiments, the PBE may have a Mw of from about 175,000 to about 260,000 g/mol, from about 190,000 to about 250,000 g/mol, from about 200,000 to about 250,000 g/mol, or from about 210,000 to about 240,000 g/mol where desirable ranges may include ranges from any lower limit to any upper limit.

The PBE may have a number average molecular weight (Mn), as measured by DRI, of from about 50,000 to about 500,000 g/mol, from about 60,000 to about 300,000 g/mol, from about 80,000 to about 250,000 g/mol, from about 90,000 to about 200,000 g/mol, or from about 100,000 to about 150,000 g/mol, where desirable ranges may include ranges from any lower limit to any upper limit. In some embodiments, the PBE may have a Mn of from about 90,000 to about 130,000 g/mol, from about 95,000 to about 125,000 g/mol, or from about 100,000 to about 120,000 g/mol, where desirable ranges may include ranges from any lower limit to any upper limit.

The PBE may have a Z-average molecular weight (Mz), as measured by MALLS, of from about 50,000 to about 1,000,000 g/mol, or from about 75,000 to about 500,000 g/mol, or from about 100,000 to about 400,000 g/mol, from about 200,000 to about 375,000 g/mol, or from about 300,000 to about 360,000 g/mol, where desirable ranges may include ranges from any lower limit to any upper limit.

The molecular weight distribution (MWD, equal to Mw/Mn) of the PBE may be from about 0.5 to about 10, from about 0.75 to about 5, from about 1.0 to about 5, from about 1.5 to about 4, or from about 1.8 to about 3, where desirable ranges may include ranges from any lower limit to any upper limit.

The PBE may have a Shore D hardness (ASTM D2240) of less than about less than about 50, less than about 45, less than about 40, less than about 35, or less than about 20.

The PBE may have a Shore A hardness (ASTM D2240) of less than about less than about 100, less than about 95, less than about 90, less than about 85, less than about 80, less than about 75, or less than 70. In some embodiments, the PBE may have a Shore A hardness of from about 10 to about 100, from about 15 to about 90, from about 20 to about 80, or from about 30 to about 70, where desirable ranges may include ranges from any lower limit to any upper limit.

In some embodiments, the PBE is a propylene-ethylene copolymer that has at least four, or at least five, or at least six, or at least seven, or at least eight, or all nine of the following properties (i) from about 10 to about 25 wt %, or from about 12 to about 20 wt %, or from about 16 wt % to about 17 wt % ethylene-derived units, based on the weight of the PBE; (ii) a Tm of from 80 to about 110° C., or from about 85 to about 110° C., or from about 90 to about 105° C.; (iii) a Hf of less than about 75 J/g, or less than 50 J/g, or less than 30 J/g, or from about 1.0 to about 15 J/g or from about 3.0 to about 10 J/g; (iv) a MI of from about 0.5 to about 3.0 g/10 min or from about 0.75 to about 2.0 g/10 min; (v) a MFR of from about 0.5 to about 10 g/10 min, or from 0.75 to about 8 g/10 min, or from about 0.75 to about 5 g/10 min; (vi) a Mw of from about 175,000 to about 260,000 g/mol, or from about 190,000 to about 250,000 g/mol, or from about 200,000 to about 250,000 g/mol, or from about 210,000 to about 240,000 g/mol; (vii) a Mn of from about 90,000 to about 130,000 g/mol, or from about 95,000 to about 125,000 g/mol, or from about 100,000 to about 120,000 g/mol; (viii) a MWD of from about 1.0 to about 5, or from about 1.5 to about 4, or from about 1.8 to about 3; and/or (ix) a Shore D hardness of less than 30, or less than 25, or less than 20. In some embodiments, such a PBE is a reactor-blended PBE as described herein.

Optionally, the PBE may also include one or more dienes. The term "diene" is defined as a hydrocarbon compound that has two unsaturation sites, i.e., a compound having two double bonds connecting carbon atoms. Depending on the context, the term "diene" as used herein refers broadly to either a diene monomer prior to polymerization, e.g., forming part of the polymerization medium, or a diene monomer after polymerization has begun (also referred to as a diene monomer unit or a diene-derived unit). In some embodiments, the diene may be selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In embodiments where the propylene-based polymer comprises a diene, the diene may be present at from 0.05 wt % to about 6 wt %, from about 0.1 wt % to about 5.0 wt %, from about 0.25 wt % to about 3.0 wt %, or from about 0.5 wt % to about 1.5 wt %, diene-derived units, based upon the total weight of the PBE.

Optionally, the PBE may be grafted (i.e., "functionalized") using one or more grafting monomers. As used herein, the term "grafting" denotes covalent bonding of the grafting monomer to a polymer chain of the propylene-based polymer. The grafting monomer can be or include at least one ethylenically unsaturated carboxylic acid or acid derivative, such as an acid anhydride, ester, salt, amide, imide, acrylates or the like. Illustrative grafting monomers include, but are not limited to, acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer. In embodiments wherein the graft monomer is maleic anhydride, the maleic anhydride concentration in the grafted polymer is preferably in the range of about 1 wt % to about 6 wt %, at least about 0.5 wt %, or at least about 1.5 wt %.

In preferred embodiments, the PBE is a reactor grade or reactor blended polymer, as defined above. That is, in preferred embodiments, the PBE is a reactor blend of a first polymer component and a second polymer component. Thus, the comonomer content of the PBE can be adjusted by adjusting the comonomer content of the first polymer component, adjusting the comonomer content of second polymer component, and/or adjusting the ratio of the first polymer component to the second polymer component present in the PBE.

In embodiments where the PBE is a reactor blended polymer, the α-olefin content of the first polymer component ("$R_1$") may be greater than 5 wt %, greater than 7 wt %, greater than 10 wt %, greater than 12 wt %, greater than 15 wt %, or greater than 17 wt %, based upon the total weight of the first polymer component. The α-olefin content of the first polymer component may be less than 30 wt %, less than 27 wt %, less than 25 wt %, less than 22 wt %, less than 20 wt %, or less than 19 wt %, based upon the total weight of the first polymer component. In some embodiments, the α-olefin content of the first polymer component may range from 5 wt % to 30 wt %, from 7 wt % to 27 wt %, from 10 wt % to 25 wt %, from 12 wt % to 22 wt %, from 15 wt % to 20 wt %, or from 17 wt % to 19 wt %. Preferably, the first polymer component comprises propylene and ethylene derived units, or consists essentially of propylene and ethylene derived units.

In embodiments where the PBE is a reactor blended polymer, the α-olefin content of the second polymer component ("$R_2$") may be greater than 1.0 wt %, greater than 1.5 wt %, greater than 2.0 wt %, greater than 2.5 wt %, greater than 2.75 wt %, or greater than 3.0 wt % α-olefin, based upon the total weight of the second polymer component. The α-olefin content of the second polymer component may be less than 10 wt %, less than 9 wt %, less than 8 wt %, less than 7 wt %, less than 6 wt %, or less than 5 wt %, based upon the total weight of the second polymer component. In some embodiments, the α-olefin content of the second polymer component may range from 1.0 wt % to 10 wt %, or from 1.5 wt % to 9 wt %, or from 2.0 wt % to 8 wt %, or from 2.5 wt % to 7 wt %, or from 2.75 wt % to 6 wt %, or from 3 wt % to 5 wt %. Preferably, the second polymer component comprises propylene and ethylene derived units, or consists essentially of propylene and ethylene derived units.

In embodiments where the PBE is a reactor blended polymer, the PBE may comprise from 1 to 25 wt % of the second polymer component, from 3 to 20 wt % of the second polymer component, from 5 to 18 wt % of the second polymer component, from 7 to 15 wt % of the second polymer component, or from 8 to 12 wt % of the second polymer component, based on the weight of the PBE, where desirable ranges may include ranges from any lower limit to any upper limit. The PBE may comprise from 75 to 99 wt % of the first polymer component, from 80 to 97 wt % of the first polymer component, from 85 to 93 wt % of the first polymer component, or from 82 to 92 wt % of the first polymer component, based on the weight of the PBE, where desirable ranges may include ranges from any lower limit to any upper limit.

The PBE are preferably prepared using homogeneous conditions, such as a continuous solution polymerization process. In some embodiments, the PBE are prepared in parallel solution polymerization reactors, such that the first reactor component is prepared in a first reactor and the second reactor component is prepared in a second reactor, and the reactor effluent from the first and second reactors are combined and blended to form a single reactor effluent from which the final PBE is separated. Exemplary methods for the preparation of PBEs may be found in U.S. Pat. Nos. 6,881,800; 7,803,876; 8,013,069; and 8,026,323 and PCT Publications WO 2011/087729; WO 2011/087730; and WO 2011/087731, incorporated herein by reference.

Suitable PBEs for use in the present invention are Vistamaxx™ polymers, commercially available from ExxonMobil Chemical Company. The invention is not limited to the use of Vistamaxx™ as the PBE.

Ethylene Copolymer

The polymer blend described herein includes one or more ethylene-based copolymers. Ethylene-based copolymers that may be useful include those comprising ethylene-derived units and one or more olefins selected from propylene and $C_4$-$C_{20}$ olefins (preferably 1-butene, 1-hexene, and/or 1-octene. The ethylene-based copolymer may have an ethylene content of greater than or equal to about 70 wt %, from about 70 to about 95 wt %, from about 75 to about 90 wt %, or from about 75 to about 85 wt %, based on the weight of the ethylene-based copolymer, where desirable ranges may include ranges from any lower limit to any upper limit, with the balance being comonomer-derived units.

Useful ethylene-based copolymer may have one or more of the following properties:

1) a density from a low of 0.85 g/cm$^3$, 0.86 g/cm$^3$, 0.87 g/cm$^3$, 0.88 g/cm$^3$, or 0.885 g/cm$^3$ to a high of 0.91 g/cm$^3$, 0.905 g/cm$^3$, or 0.902 g/cm$^3$. In some embodiments, the ethylene-based plastomer may have a density in the range of from 0.85 to 0.91 g/cm$^3$, or 0.86 to 0.91 g/cm$^3$, or 0.87 to 0.91 g/cm$^3$, or 0.88 to 0.905 g/cm$^3$, or 0.88 to 0.902 g/cm$^3$, or 0.885 to 0.902 g/cm$^3$, where desirable ranges may include ranges from any lower limit to any upper limit;

2) a heat of fusion ($H_f$) of 90 J/g or less, 70 J/g or less, 50 J/g or less, or 30 J/g or less. In some embodiments, the ethylene-based plastomer may have a Hf of from 10 to 70 J/g, or 10 to 50 J/g, or 10 to 30 J/g, where desirable ranges may include ranges from any lower limit to any upper limit;

3) a crystallinity from a low of 5 wt % to a high of 40%, 30%, or 20%, where desirable ranges may include ranges from any lower limit to any upper limit;

4) a melting point ($T_m$, peak first melt) of 100° C. or less, 95° C. or less, 90° C. or less, 80° C. or less, 70° C. or less, 60° C. or less, or 50° C. or less;

5) a crystallization temperature ($T_c$, peak) of 90° C. or less, 80° C. or less, 70° C. or less, 60° C. or less, 50° C. or less, or 40° C. or less;

6) a glass transition temperature ($T_g$) of −20° C. or less, −30° C. or less, or −40° C. or less;

7) a $M_w$ of 30 to 2,000 kg/mol, 50 to 1,000 kg/mol, or 90 to 500 kg/mol, where desirable ranges may include ranges from any lower limit to any upper limit;

8) a $M_w/M_n$ of 1 to 5, 1.4 to 4.5, 1.6 to 4, 1.8 to 3.5, or 1.8 to 2.5, where desirable ranges may include ranges from any lower limit to any upper limit;

9) a melt index (MI, 2.16 kg at 190° C.) of 0.1 to 100 g/10 min, 0.3 to 60 g/10 min, 0.5 to 40 g/10 min, or 0.7 to 20 g/10 min, where desirable ranges may include ranges from any lower limit to any upper limit; and/or 10) a Mooney viscosity (ML, (1+4) at 125° C.) of 25 to 40 mu, or 30 to 35 mu, where desirable ranges may include ranges from any lower limit to any upper limit. Mooney viscosity is to be defined and measured according to the definition and measurement procedure set forth in U.S. Pat. No. 6,686,415, incorporated by reference in its entirety.

Thermoplastic Resin

The compositions described herein may include one or more olefinic thermoplastic resins. The "olefinic thermoplastic resin" may be any material that is not a "propylene-based elastomer" or an "ethylene-based polymer" as described herein. For example, the thermoplastic resin may be a polymer or polymer blend considered by persons skilled in the art as being thermoplastic in nature, e.g., a polymer that softens when exposed to heat and returns to its original condition when cooled to room temperature. The olefinic thermoplastic resin component may contain one or more polyolefins, including polyolefin homopolymers and polyolefin copolymers. Except as stated otherwise, the term "copolymer" means a polymer derived from two or more monomers (including terpolymers, tetrapolymers, etc.,) and the term "polymer" refers to any carbon-containing compound having repeat units from one or more different monomers.

Illustrative polyolefins may be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof, and copolymers thereof. Preferably, the olefinic thermoplastic resin is unvulcanized or non cross-linked.

In preferred embodiments, the olefinic thermoplastic resin comprises, or consists of, polypropylene. The term "polypropylene" as used herein broadly means any polymer that is considered a "polypropylene" by persons skilled in the art and includes homo, impact, and random copolymers of propylene. Preferably, the polypropylene used in the compositions described herein has a melting point above 110° C. and includes at least 90 wt % propylene-derived units. The polypropylene may also include isotactic, atactic or syndiotactic sequences, and preferably includes isotactic sequences. The polypropylene can either derive exclusively from propylene monomers (i.e., having only propylene-derived units) or comprises at least 90 wt %, or at least 93 wt %, or at least 95 wt %, or at least 97 wt %, or at least 98 wt %, or at least 99 wt % propylene-derived units with the remainder derived from olefins, such as ethylene, and/or $C_4$-$C_{10}$ α-olefins.

The olefinic thermoplastic resin may have a melting temperature of from at last 110° C., or at least 120 C, or at least 130° C., and may range from 110° C. to 170° C. or higher as measured by DSC.

The thermoplastic resin may have a melt flow rate "MFR" as measured by ASTM D1238 at 230° C. and 2.16 kg weight of from about 0.1 to 100 g/10 min. In some embodiments, the thermoplastic resin may have a fractional MFR, such a polypropylene having a fractional MFR of less than about 2 g/10 min, or less than about 1.5 g/10 min, or less than about 1 g/10 min. In some embodiments, the thermoplastic resin may have a MFR of from a low of about 25, 26, 27, 28, 29, 30, 31, 32, or 33 g/10 min to a high of about 37, 38, 39, 40, 41, 42, 43, 44, or 45 g/10 min, where desirable ranges may include ranges from any lower limit to any upper limit. In some embodiments, the thermoplastic resin, such as a polypropylene, may have a MFR of from a low of about 5, 10, or 15 g/10 min to a high of about 20, 25, or 30 g/10 min, where desirable ranges may include ranges from any lower limit to any upper limit.

Fillers and Additives

The compositions described herein may also incorporate a variety of additives. The additives may include reinforcing and non-reinforcing fillers, antioxidants, stabilizers, processing oils, compatibilizing agents, lubricants (e.g., oleamide), antiblocking agents, antistatic agents, waxes, coupling agents for the fillers and/or pigment, pigments, flame retardants, antioxidants, and other processing aids known to the art. In some embodiments, the additives may comprise up to about 65 wt %, or up to about 60 wt %, or up to about 55 wt %, or up to about 50 wt % of the roofing composition. In some embodiments, the additives may comprise at least 5 wt %, or at least 10 wt %, or at least 15 wt %, or at least 20 wt %, or at least 25 wt %, or at least 30 wt %, or at least 35 wt %, or at least 40 wt % of the roofing composition.

In some embodiments, the roofing composition may include fillers and coloring agents. Exemplary materials include inorganic fillers such as calcium carbonate, clays, silica, talc, titanium dioxide or carbon black. Any type of carbon black can be used, such as channel blacks, furnace blacks, thermal blacks, acetylene black, lamp black and the like.

In some embodiments, the roofing composition may include flame retardants, such as calcium carbonate, inorganic clays containing water of hydration such as aluminum trihydroxides ("ATH") or Magnesium Hydroxide. For example, the calcium carbonate or magnesium hydroxide may be pre-blended into a masterbatch with a thermoplastic resin, such as polypropylene, or a polyethylene, such as linear low density polyethylene. For example, the flame retardant may be pre-blended with a polypropylene, an impact polypropylene-ethylene copolymer, or polyethylene, where the masterbatch comprises at least 40 wt %, or at least 45 wt %, or at least 50 wt %, or at least 55 wt %, or at least 60 wt %, or at least 65 wt %, or at least 70 wt %, or at least 75 wt %, of flame retardant, based on the weight of the masterbatch. The flame retardant masterbatch may then form at least 5 wt %, or at least 10 wt %, or at least 15 wt %, or at least 20 wt %, or at least 25 wt %, of the roofing composition. In some embodiments, the roofing composition comprises from 5 wt % to 40 wt %, or from 10 wt % to 35 wt %, or from 15 wt % to 30 wt % flame retardant masterbatch, where desirable ranges may include ranges from any lower limit to any upper limit.

In some embodiments, the roofing composition may include UV stabilizers, such as titanium dioxide or Tinuvin® XT-850. The UV stabilizers may be introduced into the roofing composition as part of a masterbatch. For example, UV stabilizer may be pre-blended into a masterbatch with a thermoplastic resin, such as polypropylene, or a polyethylene, such as linear low density polyethylene. For example, the UV stabilizer may be pre-blended with a polypropylene, an impact polypropylene-ethylene copolymer, or polyethylene, where the masterbatch comprises at least 5 wt %, or at least 7 wt %, or at least 10 wt %, or at least 12 wt %, or at least 15 wt %, of UV stabilizer, based on the weight of the masterbatch. The UV stabilizer masterbatch may then form at least 5 wt %, or at least 7 wt %, or at least 10 wt %, or at least 15 wt %, of the roofing composition. In some embodiments, the roofing composition comprises from 5 wt % to 30 wt %, or from 7 wt % to 25 wt %, or from 10 wt % to 20 wt % flame retardant masterbatch, where desirable ranges may include ranges from any lower limit to any upper limit.

Still other additives may include antioxidant and/or thermal stabilizers. In an exemplary embodiment, processing and/or field thermal stabilizers may include IRGANOX® B-225 and/or IRGANOX® 1010 available from BASF.

Roofing Compositions

The compositions described herein are particularly useful for roofing applications, such as for thermoplastic polyolefin roofing membranes. Membranes produced from the compositions may exhibit a beneficial combination of properties, and in particular exhibit an improved balance of flexibility at temperatures from −40° C. to 40° C. along with stability at elevated temperatures such as those from 40° C. to 100° C.

The roofing compositions described herein may be made either by pre-compounding or by in-situ compounding using polymer-manufacturing processes such as Banbury mixing or twin screw extrusion. The compositions may then be formed into roofing membranes. The roofing membranes may be particularly useful in commercial roofing applications, such as on flat, low-sloped, or steep-sloped substrates.

The roofing membranes may be fixed over the base roofing by any means known in the art such as via adhesive material, ballasted material, spot bonding, or mechanical spot fastening. For example, the membranes may be installed using mechanical fasteners and plates placed along the edge sheet and fastened through the membrane and into the roof decking. Adjoining sheets of the flexible membranes are overlapped, covering the fasteners and plates, and preferably joined together, for example with a hot air weld. The membrane may also be fully adhered or self-adhered to an insulation or deck material using an adhesive. Insulation is typically secured to the deck with mechanical fasteners and the flexible membrane is adhered to the insulation.

The roofing membranes may be reinforced with any type of scrim including, but not limited to, polyester, fiberglass, fiberglass reinforced polyester, polypropylene, woven or non-woven fabrics (e.g., Nylon) or combinations thereof. Preferred scrims are fiberglass and/or polyester.

In some embodiments, a surface layer of the top and/or bottom of the membrane may be textured with various patterns. Texture increases the surface area of the membrane, reduces glare and makes the membrane surface less slippery. Examples of texture designs include, but are not limited to, a polyhedron with a polygonal base and triangular faces meeting in a common vertex, such as a pyramidal base; a cone configuration having a circular or ellipsoidal configurations; and random pattern configurations.

Useful roofing membranes may have a thickness of from 0.1 to 5 mm, or from 0.5 to 4 mm.

The roofing membrane compositions described herein comprise a blend composition of a propylene-based elastomer, thermoplastic resin, at least one flame retardant, and at least one ultraviolet stabilizer. In some embodiments, the blend composition further comprises a polyalphaolefin.

The blend compositions may comprise from about 10 to about 50 wt % of the propylene-based elastomer. For example, the blend composition may comprise at least 20 wt %, or at least 25 wt %, or at least 30 wt %, or at least 35 wt %, or at least 40 wt % of the propylene-based elastomer. In some embodiments, the blend composition comprises less than 45 wt % of the propylene-based elastomer.

The propylene-based elastomer may be any of those described herein. However, in some preferred embodiments, the propylene-based elastomer may have an ethylene content of from 5 to 30 wt %, based upon the weight of the propylene-based elastomer, wherein the propylene-based elastomer is a reactor blend of a first polymer component and a second polymer component, wherein the first polymer component has an ethylene content $R_1$ of from greater than 5 to less than 30 wt % α-olefin, based upon the total weight of the first polymer component, and wherein the second polymer component has an ethylene content $R_2$ of from greater than 1 to less than 10 wt % α-olefin, based upon the total weight of the second polymer component. In some preferred embodiments, the propylene-based elastomer has an ethylene content of from 16 to 18 wt %, a melting temperature of less than 120° C., and a heat of fusion of less than 75 J/g.

The blend composition may comprise from about 5 to about 40 wt % of the thermoplastic resin. For example, the blend composition may comprise at least 7, or at least 10, or at least 12 wt % of the thermoplastic resin. For example, the blend composition may comprise less than 35 wt %, or less than 30 wt %, or less than 25 wt %, or less than 20 wt % of the thermoplastic resin.

The thermoplastic resin may be any of those described herein, however in preferred embodiments the thermoplastic resin comprises polypropylene or an impact propylene copolymer. For example, useful polypropylenes include those that have a MFR (230° C.; 2.16 kg) of greater than 15 g/10 min, or greater than 25 g/10 min, or greater than 30 g/10 min. For example, useful impact propylene copolymers include those that have a MFR (230° C.; 2.16 kg) of less than 30 g/10 min, or less than 10 g/10 min, or less than 5 g/10 min.

The blend composition may comprise from about 1 wt % to about 40 wt % of flame retardant. For example, the blend composition may comprise at least 3 wt %, or at least 5 wt %, or at least 7 wt %, or at least 10 wt %, or at least 12 wt %, or at least 15 wt %, or at least 17 wt %, or at least 20 wt % of one or more flame retardants. For example, the blend composition may comprise less than 40 wt %, or less than 35 wt %, or less than 30 wt %, or less than 25 wt % of one or more flame retardants. In some embodiments, the blend composition comprises from 10 to 30 wt %, or from 15 to 25 wt %, of at least one flame retardant.

The blend composition may comprise from about 1 wt % to about 15 wt % of at least one ultraviolet stabilizer. For example, the blend composition may comprise less than 12 wt %, or less than 10 wt %, or less than 7 wt %, or less than 5 wt %, of ultraviolet stabilizer.

The blend composition may further comprise an ethylene-based polymer. For example, the blend composition may further comprise an ethylene-based plastomer having a glass transition temperature (Tg) of from −40 to −50° C.

The blend composition may have an MFR (230° C.; 2.16 kg) of less than 10 g/10 min, or less than 7 g/10 min, or less than 5 g/10 min.

The blend composition may have has at least three, or at least four, or at least five, or at least six, or at least seven, or at least eight, or all nine, of the following properties:
 (i) a storage modulus (E') at −40° C. of less than $2.5 \times 10^{10}$, or less than $2.4 \times 10^{10}$, or less than $2.3 \times 10^{10}$, or less than $2.2 \times 10^{10}$, or less than $2.1 \times 10^{10}$ dynes/cm$^2$;
 (ii) a storage modulus (E') at −30° C. of less than $1.5 \times 10^{10}$, or less than $1.4 \times 10^{10}$, or less than $1.3 \times 10^{10}$ dynes/cm$^2$;
 (iii) a storage modulus (E') at −20° C. of less than $5 \times 10^9$, or less than $4.5 \times 10^9$, or less than $4 \times 10^9$ dynes/cm$^2$;
 (iv) a storage modulus (E') at 0° C. of less than $2 \times 10^9$ dynes/cm$^2$;
 (v) a storage modulus (E') at 20° C. of less than $1.5 \times 10^9$, or less than $1.4 \times 10^9$, or less than $1.3 \times 10^9$ dynes/cm$^2$;
 (vi) a storage modulus (E') at 40° C. of greater than $6.5 \times 10^8$, or greater than $7 \times 10^8$, or greater than $7.5 \times 10^8$ dynes/cm$^2$;

(vii) a storage modulus (E') at 60° C. of greater than 4×10$^8$, or greater than 4.1×10$^8$, or greater than 4.2×10$^8$, or greater than 4.3×10$^8$, or greater than 4.4×10$^8$ dynes/cm$^2$;

(viii) a storage modulus (E') at 80° C. of greater than 2×10$^8$, or greater than 2.2×10$^8$, or greater than 2.3×10$^8$, or greater than 2.5×10$^8$, or greater than 2.6×10$^8$ dynes/cm$^2$; or (ix) a storage modulus (E') at 100° C. of greater than 1×10$^8$, or greater than 1.2×10$^8$, or greater than 1.3×10$^8$, or greater than 1.4×10$^8$, or greater than 1.5×10$^8$ dynes/cm$^2$.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

The test methods used in the Examples are listed in Table 1 below.

TABLE 1

Test Methods

| Property Tested | ASTM Test Method |
| --- | --- |
| Tensile Stress at Break | ASTM D412 |
| Tensile Strain at Break | ASTM D412 |
| 100%, 200%, and 300% Modulus | ASTM D412 |
| Tear Strength | ASTM D624 |
| Melt Flow Rate | ASTM D1238 |
| 1% Secant Tensile Modulus - MD | ASTM D638 Type IV |
| Young's Modulus - MD | ASTM D638 Type IV |
| Stress @ Yield | ASTM D638 Type IV |
| Strain @ Yield | ASTM D638 Type IV |
| Tensile Stress @ Break - MD | ASTM D638 Type IV |
| 1% Flexural Secant Modulus | ASTM D638 Type IV |
| Tensile Strain @ Break - CD | ASTM D638 Type IV |

Dynamic Mechanical Thermal Analysis ("DMTA") tests were conducted on samples made in the Examples to provide information about the small-strain mechanical response of the sample as a function of temperature. Sample specimens were tested using a commercially available DMA instrument (e.g., TA Instruments DMA 2980 or Rheometrics RSA) equipped with a dual cantilever test fixture. The specimen was cooled to −130° C. and then heated to 60° C. at a rate of 2° C./min while being subjected to an oscillatory deformation at 0.1% strain and a frequency of 6.3 rad/sec. The output of the DMTA test is the storage modulus (E') and the loss modulus (E"). The storage modulus indicates the elastic response or the ability of the material to store energy, and the loss modulus indicates the viscous response or the ability of the material to dissipate energy. Tangent delta is the ratio of the loss modulus to storage modulus (E"/E'). Glass transition temperature (Tg) is defined to be the temperature associated with either the peak loss modulus (E") or the peak in tangent delta.

In the Examples, "PP3155" was ExxonMobil™ PP 3155 polypropylene available from ExxonMobil Chemical Company. PP3155 is a polypropylene homopolymer with a density of 0.9 g/cc and a melt mass-flow rate (MFR) (230° C.; 2.16 kg) of 36 g/10 min (ASTM D1238).

In the Examples, "PP7032" was ExxonMobil™ PP 7032E2 polypropylene available from ExxonMobil Chemical Company. PP7032 is a polypropylene impact copolymer having a density of 0.9 g/cc and a melt mass-flow rate (MFR) (230° C.; 2.16 kg) of 4.0 g/10 min (ASTM D1238).

In the Examples, "PP8244" was ExxonMobil™ PP 8244E1 polypropylene available from ExxonMobil Chemical Company. PP8244 is a polypropylene impact copolymer having a density of 0.9 g/cc and a melt mass-flow rate (MFR) (230° C.; 2.16 kg) of 29.0 g/10 min (ASTM D1238).

In the Examples, "PP7143" was ExxonMobil™ PP 7143KNE1 polypropylene available from ExxonMobil Chemical Company. PP7143 is a polypropylene impact copolymer having a density of 0.9 g/cc and a melt mass-flow rate (MFR) (230° C.; 2.16 kg) of 24.5 g/10 min (ASTM D1238).

Hifax™ CA10A is a reactor thermoplastic polyolefin available from Lyondell/Basell Industries. Hifax™ CA10A has a density of 0.88 g/cc, a melt flow rate (230° C.; 2.16 kg) of 0.6 g/10 min, a Vicat softening temperature of 60° C., a melting temperature of 142° C., and a Shore D hardness of 30. Comparative formulations include Hifax™ CA10A.

In the Examples, "Vistamaxx™6102" was Vistamaxx™ 6102 propylene-based elastomer available from ExxonMobil Chemical Company. Vistamaxx™ 6102 is a propylene-ethylene copolymer containing 16 wt % ethylene-derived units and has the following typical properties: a density of 0.862 g/cc (ASTM D1505), a melt index (190° C.; 2.16 kg) of 1.4 g/10 min (ASTM D1238), a melt mass-flow rate (MFR) (230° C.; 2.16 kg) of 3 g/10 min (ASTM D1238), a Shore A durometer hardness of 66 (ASTM D224), and a Vicat softening temperature of 52.2° C. Comparative formulations include VM6102.

The Flame Retardant Concentrate used in the examples was a masterbatch concentrate of LLDPE and 80% calcium carbonate, having a density of 1.92 g/cc.

The UV Stabilizer Concentrate used in the examples was a masterbatch containing UV stabilizing additives, titanium-dioxide as the white pigment, and a carrier resin, the masterbatch having a density of 1.04 g/cc.

In the Examples, "Vistamaxx™6100" was Vistamaxx™ 6100 propylene-based elastomer available from ExxonMobil Chemical Company. Vistamaxx™ 6100 is a propylene-ethylene copolymer containing 16 wt % ethylene-derived units and has the following typical properties: a density of 0.862 g/cc (ASTM D1505) and a melt mass-flow rate (MFR) (230° C.; 2.16 kg) of 3 g/10 min (ASTM D1238).

In the Examples, E-1 and E-2 were metallocene-catalyzed copolymers of ethylene and propylene prepared in a single reactor. The catalyst used for preparing E-1 was 1,1'-bis(4-triethylsilylphenyl)methylene-(cyclopentadienyl)(2,7-di-tertiary-butyl-9-fluorenyl)hafnium dimethyl and the activator was dimethylaniliniumtetrakis(pentafluorophenyl)borate. The catalyst used for preparing E-2 was dimethylsilylbis(indenyl)hafnium dimethyl and the activator was dimethylaniliniumtetrakis(heptafluoronaphthyl)borate. E-1 and E-2 were polymerized by the process described herein. Copolymerizations were carried out in a single-phase, liquid-filled, stirred tank reactor with continuous flow of feeds to the system and continuous withdrawal of products under equilibrium conditions. All polymerizations were done in a solvent comprising predominantly $C_6$ alkanes, referred to generally as hexane solvent, using soluble metallocene catalysts and discrete, non-coordinating borate anion as co-catalysts. A homogeneous dilute solution of tri-n-octyl aluminum in hexane was used as a scavenger in concentrations appropriate to maintain reaction. Hydrogen, was added, if necessary, to control molecular weight. The hexane solvent was purified over beds of 3A mole sieves and basic alumina. All feeds were pumped into the reactors by metering pumps, except for the ethylene, which flowed as a gas through a mass flow meter/controller. Reactor temperature was controlled adiabatically by controlled chilling of the feeds and using the heat of polymerization to heat the reactor. The reactors were maintained at a pressure in excess of the vapor pressure of the reactant mixture to keep the reactants in the liquid phase. In this manner the reactors were operated liquid full in a homogeneous single phase. Ethylene and propylene feeds were combined into one stream and then mixed with a pre-chilled hexane stream. A hexane solution of a tri-n-octyl aluminum scavenger was added to the combined solvent and monomer stream just before it entered the reactor to further reduce the concentration of any catalyst poisons. A mixture of the catalyst components in solvent was pumped separately to the reactor and entered through a separate port. The reaction mixture was stirred aggressively using a magna-drive system with three directionally opposed tilt paddle stirrers set to about 750 rpm to provide thorough mixing over a broad range of solution viscosities. Flow rates were set to maintain an average residence time in the reactor of about 10 minutes. On exiting the reactor, the copolymer mixture was subjected to quenching, a series of concentration steps, heat and vacuum stripping and pelletization, the general conditions of which are described in International Patent Publication WO 99/45041, incorporated herein by reference in its entirety. Additional processing conditions for the polymerization process of E-1 and E-2 are included below in Table 2.

TABLE 2

Ethylene Copolymer Processing Conditions

|  | E-1 | E-2 |
|---|---|---|
| Ethylene Feed Rate (kg/hr) | 8.7 | 10.0 |
| Propylene Feed Rate (kg/hr) | 3.8 | 2.5 |
| Solvent Rate (kg/hr) | 69.7 | 83.7 |
| Hydrogen Rate (sccm) | 35 | 0 |
| Reactor Temperature (° C.) | 140 | 142 |
| Feed Temperature (° C.) | 15 | 17 |
| Ethylene Conversion (%) | 81.9 | 89.1 |
| Propylene Conversion (%) | 55.8 | 59.6 |

E-1 had an overall ethylene content of about 78 wt %, with the balance being propylene-derived units. E-1 had a Mooney viscosity ML (1+4) at 125° C. of about 36 MU and a density of about 0.876 g/cc (ASTM D1505). E-2 had an overall ethylene content of about 85 wt %, with the balance being propylene-derived units. E-2 had a Mooney viscosity ML (1+4) at 125° C. of about 31 MU and a density of about 0.876 g/cc (ASTM D1505).

In an embodiment, Vistamaxx™6100 is blended with E-1/E-2 prior to compounding with the remaining ingredients. In an embodiment, Vistamaxx™6100 is reactor blended with E-1/E-2. In an embodiment, Vistamaxx™6100 is physically blended with E-1/E-2.

Tables 3-12 below report samples of formulations and testing properties for Examples 1-5. The roofing formulations of the tables below were compounded in a 1.5 inch single screw extruder equipped with a sheeting die. The formulations were first tumble blended to a batch weight of 13 Kg and introduced directly into the extruder hopper. The melt temperature was maintained around 200° C. Sheet profiles were produced in width ranging from 8 to 9 inches and thickness in the range of 40 to 60 mils. The die gaps were suitably adjusted to maintain uniformity in thickness along the profile width. Extruder speed and take-up roll velocity were suitably adjusted to maintain thickness within the required range. The sheet profiles were tested in both machine direction (MD) and cross direction (CD).

Additional roofing formulations at higher impact copolymer content were compounded in a HAAKE single screw extruder fitted with a sheeting die. Sheet profiles were produced in width of 50 mm and thickness in the range of 40 to 60 mils, with the remaining processing conditions similar to that described above. The sheet profiles were tested in both MD and CD.

Example 1

In Example 1, samples of the formulations in Table 3 were prepared. The amount of each ingredient in the formulation is listed in Table 3 in weight percent, based on the total weight of the formulation. C1, C2, and C3 are comparative samples and Samples 1, 2, 3, and 4 are inventive. The resulting samples were tested for various properties with the results shown in Table 4.

TABLE 3

Example 1 Formulations

|  | C1 | C2 | C3 | 1 | 2 | 3 | 4 |
|---|---|---|---|---|---|---|---|
| Vistamaxx ™ 6100 | — | — | — | 33.6 | 33.6 | 37.8 | 37.8 |
| Vistamaxx ™ 6102 | 42.0 | 10.1 | — | — | — | — | — |
| E-1 | — | — | — | 8.4 | — | 4.2 | — |
| E-2 | — | — | — | — | 8.4 | — | 4.2 |
| PP3155 | 14.0 | — | — | 14.0 | 14.0 | 14.0 | 14.0 |
| Hifax CA10A | — | 45.9 | 56.0 | — | — | — | — |
| Flame Retardant Concentrate | 28.0 | 28.0 | 28.0 | 28.0 | 28.0 | 28.0 | 28.0 |
| UV Stabilizer Concentrate | 16.0 | 16.0 | 16.0 | 16.0 | 16.0 | 16.0 | 16.0 |
| Total (wt %) | 100.0 | 100.0 | 100.0 | 100.0 | 100.0 | 100.0 | 100.0 |

TABLE 4

Example 1 Properties

|  |  | C1 | C2 | C3 | 1 | 2 | 3 | 4 |
|---|---|---|---|---|---|---|---|---|
| Calculated Compound Density | g/cc | 1.055 | 1.072 | 1.078 | 1.054 | 1.054 | 1.054 | 1.054 |
| Tan Delta (peak value) | ° C. | −24 | −25 | −25 | −25 | −25 | −25 | −25 |
| Polysplit | % | — | — | — | 20 | 20 | 10 | 10 |
| E″ (peak value) | ° C. | −28 | −30 | −30 | −27 | −28 | −28 | −27 |
| E' at −60° C. | dyne/cm$^2$ | 2.58E+10 | 1.86E+10 | 3.70E+10 | 2.72E+10 | 3.22E+10 | 3.29E+10 | 2.76E+10 |
| E' at −50° C. | dyne/cm$^2$ | 2.47E+10 | 1.76E+10 | 3.38E+10 | 2.60E+10 | 3.04E+10 | 3.12E+10 | 2.64E+10 |

TABLE 4-continued

Example 1 Properties

| | | C1 | C2 | C3 | 1 | 2 | 3 | 4 |
|---|---|---|---|---|---|---|---|---|
| E' at −40° C. | dyne/cm$^2$ | 2.35E+10 | 1.46E+10 | 2.63E+10 | 2.46E+10 | 2.81E+10 | 2.87E+10 | 2.50E+10 |
| E' at −30° C. | dyne/cm$^2$ | 1.83E+10 | 9.03E+09 | 1.54E+10 | 2.03E+10 | 2.10E+10 | 1.99E+10 | 2.00E+10 |
| E' at −20° C. | dyne/cm$^2$ | 3.79E+09 | 3.30E+09 | 6.60E+09 | 6.98E+09 | 5.97E+09 | 4.63E+09 | 5.94E+09 |
| E' at 0° C. | dyne/cm$^2$ | 1.56E+09 | 1.57E+09 | 2.93E+09 | 3.61E+09 | 3.01E+09 | 2.23E+09 | 3.11E+09 |
| E' at 20° C. | dyne/cm$^2$ | 1.13E+09 | 1.03E+09 | 1.83E+09 | 2.55E+09 | 2.13E+09 | 1.60E+09 | 2.20E+09 |
| E' at 40° C. | dyne/cm$^2$ | 6.50E+08 | 7.03E+08 | 9.40E+08 | 1.59E+09 | 1.16E+09 | 8.38E+08 | 1.29E+09 |
| E' at 60° C. | dyne/cm$^2$ | 3.27E+08 | 3.59E+08 | 4.61E+08 | 7.73E+08 | 5.18E+08 | 3.56E+08 | 7.35E+08 |
| E' at 80° C. | dyne/cm$^2$ | 1.74E+08 | 1.84E+08 | 2.38E+08 | 4.39E+08 | 2.64E+08 | 1.86E+08 | 4.38E+08 |
| E' at 100° C. | dyne/cm$^2$ | 9.17E+07 | 9.35E+07 | 1.26E+08 | 2.65E+08 | 1.50E+08 | 1.01E+08 | 2.88E+08 |
| 100% Modulus-MD | MPa | 6.0 | 5.9 | 6.1 | 5.6 | 5.6 | 5.2 | 5.4 |
| 100% Modulus-CD | MPa | 4.1 | 3.8 | 4.2 | 4.5 | 4.8 | 4.7 | 3.7 |
| Tear Strength-MD | kN/m | 49 | 55 | 55 | 61 | 62 | 50 | 55 |
| Tear Strength-CD | kN/m | 48 | 40 | 46 | 47 | 51 | 52 | 49 |
| Tensile Stress @ Break-MD | MPa | >18.2 | 16.6 | 16.2 | 17.3 | 15.6 | 18.1 | 17.6 |
| Tensile Stress @ Break-CD | MPa | 11.7 | 10.7 | 10.4 | 12.0 | 12.6 | 13.3 | 10.1 |
| Tensile Strain @ Break-MD | % | >1000 | 945 | 877 | 843 | 798 | 876 | 854 |
| Tensile Strain @ Break-CD | % | 919 | 894 | 850 | 776 | 747 | 785 | 789 |

Tables 3 and 4 show TPO formulations containing polypropylene homopolymer, ExxonMobil™ PP 3155 resin. Polysplit, expressed as percent, is defined as the ratio of the ethylene copolymer (E-1 or E-2) to the total polymer component of ethylene copolymer and PBE resin. In the inventive examples 1 through 4, polysplit varies from 10 to 20%. Comparative formulation C1 is a composition without the ethylene copolymer. Comparative example C2 is a composition containing a blend of Vistamaxx™6102 PBE and Hifax™ CA 10 A. Comparative example C3 is a formulation comprising the Hifax™ CA 10 A polymer. The tear strength in machine direction is higher in Examples 1 through 4 compared to comparative Example C1. With relation to comparative Example C3, the 100% modulus properties of the inventive formulations are lower, which is a reflection of the flexibility of these compositions. Furthermore, the presence of the minor ethylene propylene copolymer imparts enhanced low temperature properties (−53° C. brittleness temperature in Example 1) compared to formulations without the copolymer (−45° C. in comparative example C1).

FIG. 1 shows a plot of Elastic modulus, E' with temperature. Examples 1 and 4 show similar modulus properties as comparative Example C3 up to 20° C., while Example 2 shows modulus response that is close to composition C3 across the entire temperature range. The higher modulus values seen in Example 1 and Example 4 at 100° C. relative to comparative Example C2 and C3 can help mitigate roll-blocking upon prolonged exposure to ambient conditions.

Example 2

In Example 2, samples of the formulations in Table 5 were prepared. The amount of each ingredient in the formulation is listed in Table 5 in weight percent, based on the total weight of the formulation. C4, C2, and C3 are comparative samples and Samples 5, 6, 7, and 8 are inventive samples. The resulting samples were tested for various properties with the results shown in Table 6.

TABLE 5

Example 2 Formulations

| | C4 | C2 | C3 | 5 | 6 | 7 | 8 |
|---|---|---|---|---|---|---|---|
| Vistamaxx ™ 6100 | — | — | — | 33.6 | 33.6 | 37.8 | 37.8 |
| Vistamaxx ™ 6102 | 42.0 | 10.1 | — | — | — | — | — |
| E-1 | — | — | — | 8.4 | — | 4.2 | — |
| E-2 | — | — | — | — | 8.4 | — | 4.2 |
| PP7032 | 14.0 | — | — | 14.0 | 14.0 | 14.0 | 14.0 |
| Hifax CA10A | — | 45.9 | 56.0 | — | — | — | — |
| Flame Retardant Concentrate | 28.0 | 28.0 | 28.0 | 28.0 | 28.0 | 28.0 | 28.0 |
| UV Stabilizer Concentrate | 16.0 | 16.0 | 16.0 | 16.0 | 16.0 | 16.0 | 16.0 |
| Total (wt %) | 100.0 | 100.0 | 100.0 | 100.0 | 100.0 | 100.0 | 100.0 |

TABLE 6

Example 2 Properties

| | | C4 | C2 | C3 | 5 | 6 | 7 | 8 |
|---|---|---|---|---|---|---|---|---|
| Calculated Compound Density | g/cc | 1.054 | 1.072 | 1.078 | 1.054 | 1.054 | 1.054 | 1.054 |
| Tan Delta (peak value) | ° C. | −25 | −25 | −25 | −25 | −25 | −24 | −25 |
| Polysplit | % | — | — | — | 20 | 20 | 10 | 10 |
| E" (peak value) | ° C. | −28 | −30 | −30 | −27 | −28 | −28 | −27 |
| E' at −60° C. | dyne/cm$^2$ | | 1.86E+10 | 3.70E+10 | 2.53E+10 | 2.63E+10 | 2.12E+10 | 2.60E+10 |
| E' at −50° C. | dyne/cm$^2$ | | 1.76E+10 | 3.38E+10 | 2.35E+10 | 2.47E+10 | 2.01E+10 | 2.44E+10 |
| E' at −40° C. | dyne/cm$^2$ | | 1.46E+10 | 2.63E+10 | 2.11E+10 | 2.24E+10 | 1.81E+10 | 2.23E+10 |
| E' at −30° C. | dyne/cm$^2$ | | 9.03E+09 | 1.54E+10 | 1.47E+10 | 1.63E+10 | 1.43E+10 | 1.68E+10 |

TABLE 6-continued

Example 2 Properties

| | | C4 | C2 | C3 | 5 | 6 | 7 | 8 |
|---|---|---|---|---|---|---|---|---|
| E' at −20° C. | dyne/cm$^2$ | | 3.30E+09 | 6.60E+09 | 3.62E+09 | 3.99E+09 | 2.57E+09 | 3.08E+09 |
| E' at 0° C. | dyne/cm$^2$ | | 1.57E+09 | 2.93E+09 | 1.73E+09 | 2.04E+09 | 9.00E+08 | 1.37E+09 |
| E' at 20° C. | dyne/cm$^2$ | | 1.03E+09 | 1.83E+09 | 1.26E+09 | 1.48E+09 | 5.63E+08 | 9.71E+08 |
| E' at 40° C | dyne/cm$^2$ | | 7.03E+08 | 9.40E+08 | 7.32E+08 | 7.52E+08 | 3.56E+08 | 5.28E+08 |
| E' at 60° C. | dyne/cm$^2$ | | 3.59E+08 | 4.61E+08 | 3.04E+08 | 3.73E+08 | 2.17E+08 | 2.79E+08 |
| E' at 80° C. | dyne/cm$^2$ | | 1.84E+08 | 2.38E+08 | 1.60E+08 | 1.85E+08 | 1.18E+08 | 1.49E+08 |
| E' at 100° C. | dyne/cm$^2$ | | 9.35E+07 | 1.26E+08 | 8.92E+07 | 1.02E+08 | 7.10E+07 | 8.72E+07 |
| 100% Modulus-MD | MPa | 5.6 | 5.9 | 6.1 | 4.8 | 5.0 | 4.7 | 5.0 |
| 100% Modulus-CD | MPa | 3.5 | 3.8 | 4.2 | 3.7 | 4.1 | 3.8 | 3.8 |
| Tear Strength-MD | kN/m | 43 | 55 | 55 | 51 | 51 | 47 | 49 |
| Tear Strength-CD | kN/m | 42 | 40 | 46 | 45 | 48 | 46 | 49 |
| Tensile Stress @ Break-MD | MPa | >17.5 | 16.6 | 16.2 | 16.9 | 17.0 | 15.8 | 16.7 |
| Tensile Stress @ Break-CD | MPa | 10 | 10.7 | 10.4 | 10.1 | 10.9 | 10.4 | 11.9 |
| Tensile Strain @ Break-MD | % | >1000 | 945 | 877 | 855 | 884 | 866 | 852 |
| Tensile Strain @ Break-CD | % | 896 | 894 | 850 | 789 | 783 | 787 | 807 |

Tables 5 and 6 show TPO formulations containing polypropylene impact copolymer, ExxonMobil™ PP 7032 resin. Polysplit, expressed as percent, is defined as the ratio of the ethylene copolymer (E-1 or E-2) to the total polymer component of ethylene copolymer and PBE resin. In the inventive examples 5 through 8, polysplit varies from 10 to 20%. Comparative formulation C4 is a composition without the ethylene copolymer. Comparative example C2 is a composition containing a blend of Vistamaxx™ 6102 PBE and Hifax™ CA 10 A. Comparative example C3 is a formulation comprising the Hifax™ CA 10 A polymer. The tear strength in both MD and CD is higher in Examples 5 through 8 comparative Example C4. With relation to comparative example C3, the 100% modulus properties of the inventive formulations are lower, which is a reflection of the flexibility of these formulations. The presence of the minor ethylene propylene copolymer imparts enhanced low temperature properties (−53° C. brittleness temperature in Example 5) compared to formulations without the copolymer (−46° C. in comparative example C4).

Figure 2:
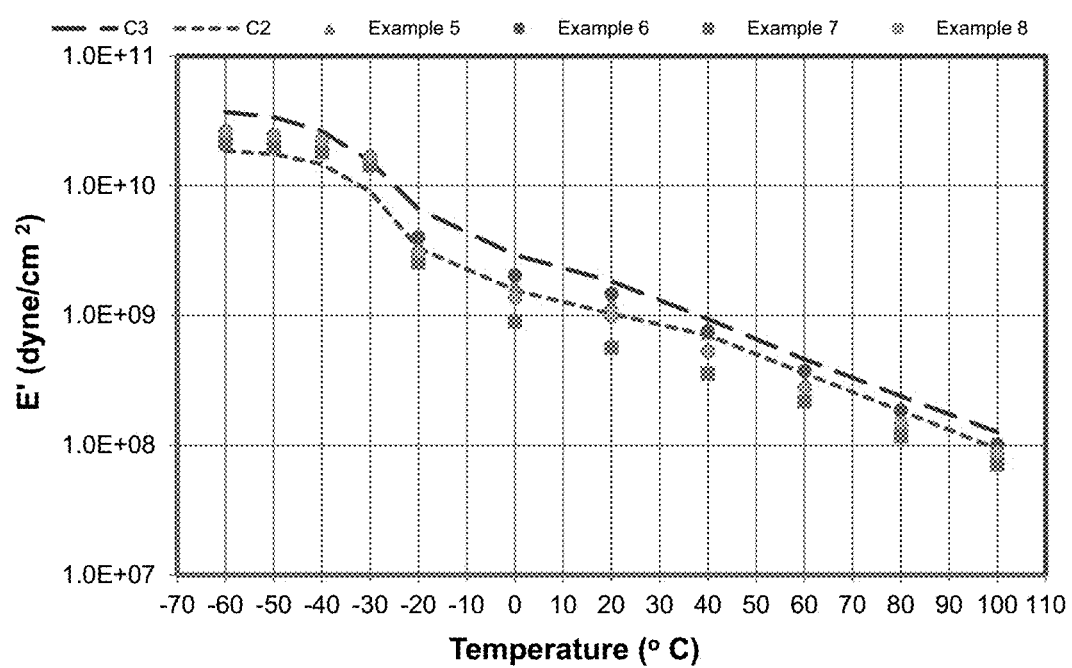
FIG. 2 illustrates the storage modulus (E') of Samples C2, C3, 5, 6, 7 and 8.

FIG. 2 shows a plot of Elastic modulus, E' with temperature. Examples 5 through 8 show modulus properties lower than comparative example C3 across the entire temperature range. The presence of the impact copolymer component in these formulations imparts enhanced flexibility similar to comparative example C2. The lower modulus is a desirable attribute for roofing applications.

Example 3

In Example 3, samples of the formulations in Table 7 were prepared. The amount of each ingredient in the formulation is listed in Table 7 in weight percent, based on the total weight of the formulation. C5 and C6 are comparative samples and Samples 9, 10, 11, and 12 are inventive samples. The resulting samples were tested for various properties with the results shown in Table 8.

TABLE 7

Example 3 Formulations

| | C5 | C6 | 9 | 10 | 11 | 12 |
|---|---|---|---|---|---|---|
| Vistamaxx ™ 6100 | 33.6 | — | 30.2 | 26.9 | 24.6 | 22.4 |
| E-1 | — | — | 3.4 | 6.4 | 6.2 | 5.6 |
| PP7032 | 22.4 | — | 22.4 | 22.4 | 25.2 | 28.0 |
| Hifax CA10A | — | 56.0 | — | — | — | — |
| Flame Retardant Concentrate | 28.0 | 28.0 | 28.0 | 28.0 | 28.0 | 28.0 |
| UV Stabilizer Concentrate | 16.0 | 16.0 | 16.0 | 16.0 | 16.0 | 16.0 |
| Total (wt %) | 100.0 | 100.0 | 100.0 | 100.0 | 100.0 | 100.0 |

TABLE 8

Example 3 Properties

| | | C5 | C6 | 9 | 10 | 11 | 12 |
|---|---|---|---|---|---|---|---|
| Polysplit | % | — | — | 10 | 20 | 20 | 20 |
| E' at −60° C. | dyne/cm$^2$ | 2.53E+10 | 2.78E+10 | 2.62E+10 | 2.67E+10 | 3.22E+10 | 2.71E+10 |
| E' at −50° C. | dyne/cm$^2$ | 2.37E+10 | 2.50E+10 | 2.46E+10 | 2.47E+10 | 2.98E+10 | 2.49E+10 |
| E' at −40° C. | dyne/cm$^2$ | 2.16E+10 | 1.98E+10 | 2.19E+10 | 2.15E+10 | 2.60E+10 | 2.19E+10 |
| E' at −30° C. | dyne/cm$^2$ | 1.49E+10 | 1.13E+10 | 1.45E+10 | 1.45E+10 | 1.75E+10 | 1.57E+10 |
| E' at −20° C. | dyne/cm$^2$ | 5.98E+09 | 6.03E+09 | 4.98E+09 | 5.80E+09 | 9.50E+09 | 8.33E+09 |
| E' at 0° C. | dyne/cm$^2$ | 3.52E+09 | 3.17E+09 | 2.87E+09 | 3.41E+09 | 6.14E+09 | 5.66E+09 |
| E' at 20° C. | dyne/cm$^2$ | 2.49E+09 | 2.19E+09 | 1.97E+09 | 2.55E+09 | 4.42E+09 | 4.47E+09 |
| E' at 40° C. | dyne/cm$^2$ | 1.54E+09 | 1.19E+09 | 1.13E+09 | 1.39E+09 | 2.58E+09 | 2.89E+09 |
| E' at 60° C. | dyne/cm$^2$ | 9.45E+08 | 5.56E+08 | 6.33E+08 | 7.78E+08 | 1.47E+09 | 1.64E+09 |
| E' at 80° C. | dyne/cm$^2$ | 5.99E+08 | 2.95E+08 | 3.73E+08 | 4.50E+08 | 9.04E+08 | 9.81E+08 |
| E' at 100° C. | dyne/cm$^2$ | 3.82E+08 | 1.62E+08 | 2.37E+08 | 2.79E+08 | 5.85E+08 | 6.39E+08 |
| 1% Secant Tensile Modulus-MD | MPa | 253 | 173 | 246 | 265 | 347 | 350 |
| Young's Modulus-MD | MPa | 347 | 202 | 337 | 351 | 431 | 471 |
| Stress @ Yield | MPa | 7.2 | 6.1 | 7.1 | 7.2 | 8.0 | 8.1 |
| Strain @ Yield | % | 26.9 | 37.3 | 23.6 | 21.0 | 18.3 | 16.8 |
| Tensile Stress @ Break-MD | MPa | 20.8 | 17.5 | 19.1 | 19.3 | 19.4 | 19.4 |

TABLE 8-continued

Example 3 Properties

|  |  | C5 | C6 | 9 | 10 | 11 | 12 |
| --- | --- | --- | --- | --- | --- | --- | --- |
| 1% Flexural Secant Modulus | MPa | 224 | 193 | 235 | 308 | 421 | 414 |
| Tensile Strain @ Break-MD | % | 690 | 711 | 660 | 664 | 607 | 601 |

Tables 7 and 8 show TPO formulations containing polypropylene impact copolymer, ExxonMobil™ PP 7032 resin at increasing ICP content. These formulations were compounded in the HAAKE single screw extruder. Polysplit, expressed as percent, is defined as the ratio of the ethylene copolymer (E-1) to the total polymer component of ethylene copolymer and PBE resin. In the inventive examples 9 through 12, polysplit varies from 10 to 20%. Comparative formulation C5 is a composition without the ethylene copolymer. Comparative example C6 is a formulation comprising the Hifax™ CA 10 a polymer. In the inventive examples 9 through 12, the brittleness temperature is lower than the comparative example C5. The presence of the ethylene copolymer as a minor component enhances low temperature properties of the inventive formulations.

Figure 3:
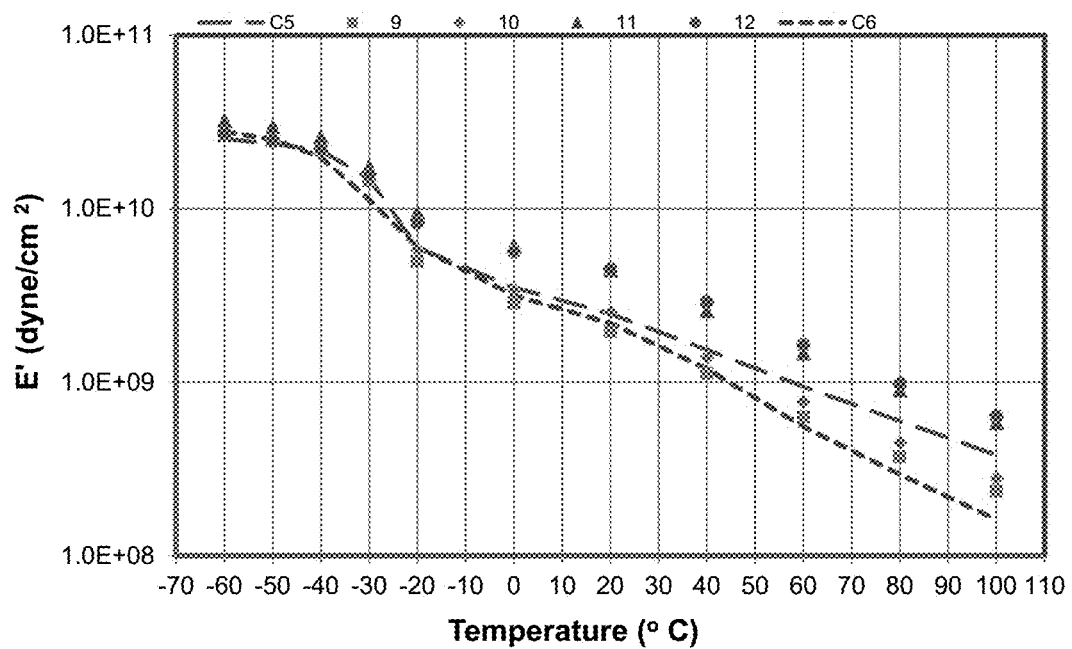
FIG. 3 illustrates the storage modulus (E') of Samples C5, C6, 9, 10, 11, and 12.

FIG. 3 shows a plot of elastic modulus verses temperature for the formulations shown in Table 7. Example 9 which contains the ethylene copolymer component matches the elastic modulus of the comparative formulation C5 in the service temperature range of −40° C. to 40° C., and also exhibits higher elastic modulus at elevated temperatures (80° C. to 100° C.). The higher modulus at elevated temperature is a desirable attribute to mitigate roll blocking during ware-house storage. Inventive formulations 10 through 12 exhibit higher modulus at elevated temperature relative to compare example C6. This arises from the higher polypropylene content in the formulation.

Example 4

In Example 4, samples of the formulations in Table 9 were prepared. The amount of each ingredient in the formulation is listed in Table 9 in weight percent, based on the total weight of the formulation. C7 and C6 are comparative samples and Samples 13, 14, and 15 are inventive samples. The resulting samples were tested for various properties with the results shown in Table 10.

TABLE 9

Example 4 Formulations

|  | C7 | C6 | 13 | 14 | 15 |
| --- | --- | --- | --- | --- | --- |
| Vistamaxx ™ 6100 | 33.6 | — | 26.9 | 24.6 | 22.4 |
| E-1 | — | — | 6.7 | 6.2 | 5.6 |
| PP8244 | 22.4 | — | 22.4 | 25.2 | 28.0 |
| Hifax CA10A | — | 56.0 | — | — | — |
| Flame Retardant Concentrate | 28.0 | 28.0 | 28.0 | 28.0 | 28.0 |
| UV Stabilizer Concentrate | 16.0 | 16.0 | 16.0 | 16.0 | 16.0 |
| Total (wt %) | 100.0 | 100.0 | 100.0 | 100.0 | 100.0 |

TABLE 10

Example 4 Properties

|  |  | C7 | C6 | 13 | 14 | 15 |
| --- | --- | --- | --- | --- | --- | --- |
| E' at −60° C. | dyne/cm$^2$ | 2.70E+10 | 2.78E+10 | 2.78E+10 | 2.92E+10 | 3.22E+10 |
| E' at −50° C. | dyne/cm$^2$ | 2.45E+10 | 2.50E+10 | 2.52E+10 | 2.64E+10 | 2.86E+10 |
| E' at −40° C. | dyne/cm$^2$ | 2.18E+10 | 1.98E+10 | 2.16E+10 | 2.27E+10 | 2.37E+10 |
| E' at −30° C. | dyne/cm$^2$ | 1.48E+10 | 1.13E+10 | 1.51E+10 | 1.56E+10 | 1.61E+10 |
| E' at −20° C. | dyne/cm$^2$ | 4.87E+09 | 6.03E+09 | 7.07E+09 | 6.97E+09 | 8.05E+09 |
| E' at 0° C. | dyne/cm$^2$ | 2.72E+09 | 3.17E+09 | 4.30E+09 | 4.20E+09 | 5.44E+09 |
| E' at 20° C. | dyne/cm$^2$ | 2.04E+09 | 2.19E+09 | 3.08E+09 | 3.07E+09 | 3.86E+09 |
| E' at 40° C. | dyne/cm$^2$ | 1.18E+09 | 1.19E+09 | 1.88E+09 | 1.82E+09 | 2.29E+09 |
| E' at 60° C. | dyne/cm$^2$ | 6.51E+08 | 5.56E+08 | 1.04E+09 | 9.92E+08 | 1.32E+09 |
| E' at 80° C. | dyne/cm$^2$ | 3.67E+08 | 2.95E+08 | 6.04E+08 | 5.68E+08 | 7.75E+08 |
| E' at 100° C. | dyne/cm$^2$ | 2.18E+08 | 1.62E+08 | 3.68E+08 | 3.50E+08 | 4.79E+08 |
| 1% Secant Tensile Modulus-MD | MPa | 195 | 173 | 242 | 275 | 288 |
| Young's Modulus-MD | MPa | 236 | 202 | 316 | 354 | 397 |
| Stress @ Yield | MPa | 5.8 | 6.1 | 6.4 | 6.6 | 7.3 |
| Strain @ Yield | % | 23.4 | 37.3 | 19.5 | 20.9 | 20.7 |
| Tensile Stress @ Break-MD | MPa | 17.3 | 17.5 | 15.8 | 15.5 | 17.8 |
| 1% Flexural Secant Modulus | MPa | 212 | 193 | 305 | 328 | 295 |
| Tensile Strain @ Break-CD | % | 727 | 711 | 670 | 633 | 669 |

Tables 9 and 10 show TPO formulations containing polypropylene impact copolymer, ExxonMobil™ PP 8244 resin at increasing ICP content. These formulations were compounded in the HAAKE single screw extruder. Polysplit, expressed as percent, is defined as the ratio of the ethylene copolymer (E-1) to the total polymer component of ethylene copolymer and PBE resin. In the inventive examples 13 through 15, polysplit is at 20%. Comparative formulation C5 is a composition without the ethylene copolymer. Comparative example C6 is a formulation comprising the Hifax™ CA 10 a polymer.

Figure 4:
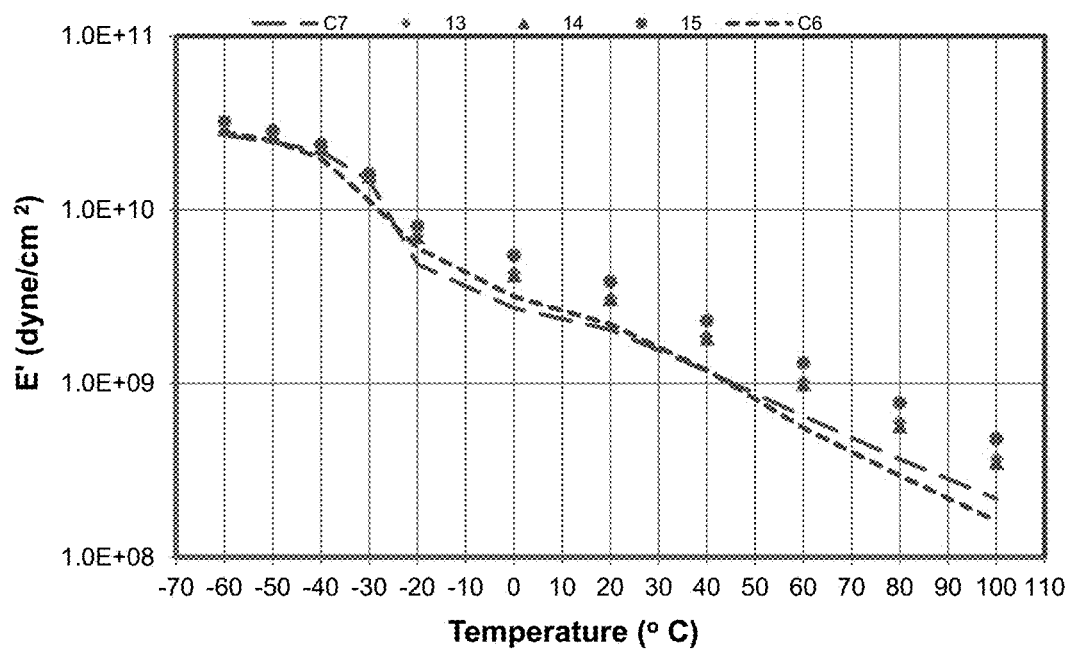
FIG. 4 illustrates the storage modulus (E') of Samples C6, C7, 13, 14, and 15.

FIG. 4 shows a plot of elastic modulus verses temperature for the formulations shown in Table 9. The inventive formulations 13 through 15 exhibits higher elastic modulus at elevated temperatures (80° C. to 100° C.) compared to comparative example C7 and C6 respectively. The higher modulus at elevated temperature is a desirable attribute to mitigate roll blocking during ware-house storage.

Example 5

In Example 5, samples of the formulations in Table 11 were prepared. The amount of each ingredient in the formulation is listed in Table 11 in weight percent, based on the total weight of the formulation. C8 and C6 are comparative samples and Samples 16, 17, and 18 are inventive samples. The resulting samples were tested for various properties with the results shown in Table 12.

TABLE 11

Example 5 Formulations

|  | C8 | C6 | 16 | 17 | 18 |
|---|---|---|---|---|---|
| Vistamaxx™ 6100 | 33.6 | — | 26.9 | 24.6 | 22.4 |
| E-1 | — | — | 6.7 | 6.2 | 5.6 |
| PP7143 | 22.4 | — | 22.4 | 25.2 | 28.0 |
| Hifax CA10A | — | 56.0 | — | — | — |
| Flame Retardant Concentrate | 28.0 | 28.0 | 28.0 | 28.0 | 28.0 |
| UV Stabilizer Concentrate | 16.0 | 16.0 | 16.0 | 16.0 | 16.0 |
| Total (wt %) | 100.0 | 100.0 | 100.0 | 100.0 | 100.0 |

TABLE 12

Example 5 Properties

|  |  | C8 | C6 | 16 | 17 | 18 |
|---|---|---|---|---|---|---|
| Polysplit | % |  |  | 20 | 20 | 20 |
| E' at −60° C. | dyne/cm$^2$ | 3.81E+10 | 2.78E+10 | 2.97E+10 | 3.10E+10 | 3.40E+10 |
| E' at −50° C. | dyne/cm$^2$ | 3.46E+10 | 2.50E+10 | 2.67E+10 | 2.79E+10 | 3.08E+10 |
| E' at −40° C. | dyne/cm$^2$ | 3.05E+10 | 1.98E+10 | 2.29E+10 | 2.39E+10 | 2.64E+10 |
| E' at −30° C. | dyne/cm$^2$ | 1.90E+10 | 1.13E+10 | 1.56E+10 | 1.70E+10 | 1.93E+10 |
| E' at −20° C. | dyne/cm$^2$ | 6.46E+09 | 6.03E+09 | 6.93E+09 | 9.29E+09 | 1.18E+10 |
| E' at 0° C. | dyne/cm$^2$ | 3.61E+09 | 3.17E+09 | 4.32E+09 | 6.32E+09 | 8.08E+09 |
| E' at 20° C. | dyne/cm$^2$ | 2.62E+09 | 2.19E+09 | 3.26E+09 | 4.86E+09 | 5.92E+09 |
| E' at 40° C. | dyne/cm$^2$ | 1.34E+09 | 1.19E+09 | 1.95E+09 | 2.95E+09 | 3.79E+09 |
| E' at 60° C. | dyne/cm$^2$ | 6.95E+08 | 5.56E+08 | 1.06E+09 | 1.68E+09 | 2.25E+09 |
| E' at 80° C. | dyne/cm$^2$ | 4.05E+08 | 2.95E+08 | 6.14E+08 | 1.01E+09 | 1.42E+09 |
| E' at 100° C. | dyne/cm$^2$ | 2.44E+08 | 1.62E+08 | 3.85E+08 | 6.32E+08 | 9.54E+08 |
| 1% Secant Tensile Modulus-MD | MPa | 228 | 173 | 268 | 297 | 403 |
| Young's Modulus-MD | MPa | 280 | 202 | 347 | 396 | 609 |
| Stress @ Yield | MPa | 6.62 | 6.1 | 6.99 | 7.5 | 8.1 |
| Strain @ Yield | % | 26.6 | 37.3 | 22.7 | 22.1 | 14.7 |
| Tensile Stress @ Break-MD | MPa | 18.3 | 17.5 | 16.4 | 18.8 | 16.9 |
| 1% Flexural Secant Modulus | MPa | 240 | 193 | 292 | 235 | 448 |

Tables 11 and 12 show TPO formulations containing polypropylene impact copolymer, ExxonMobil™ PP 7143 resin at increasing ICP content. These formulations were compounded in the HAAKE single screw extruder. Polysplit, expressed as percent, is defined as the ratio of the ethylene copolymer (E-1) to the total polymer component of ethylene copolymer and PBE resin. In the inventive examples 16 through 18, polysplit is at 20%. Comparative formulation C8 is a composition without the ethylene copolymer. Comparative example C6 is a formulation comprising the Hifax™ CA 10 a polymer.

Figure 5:
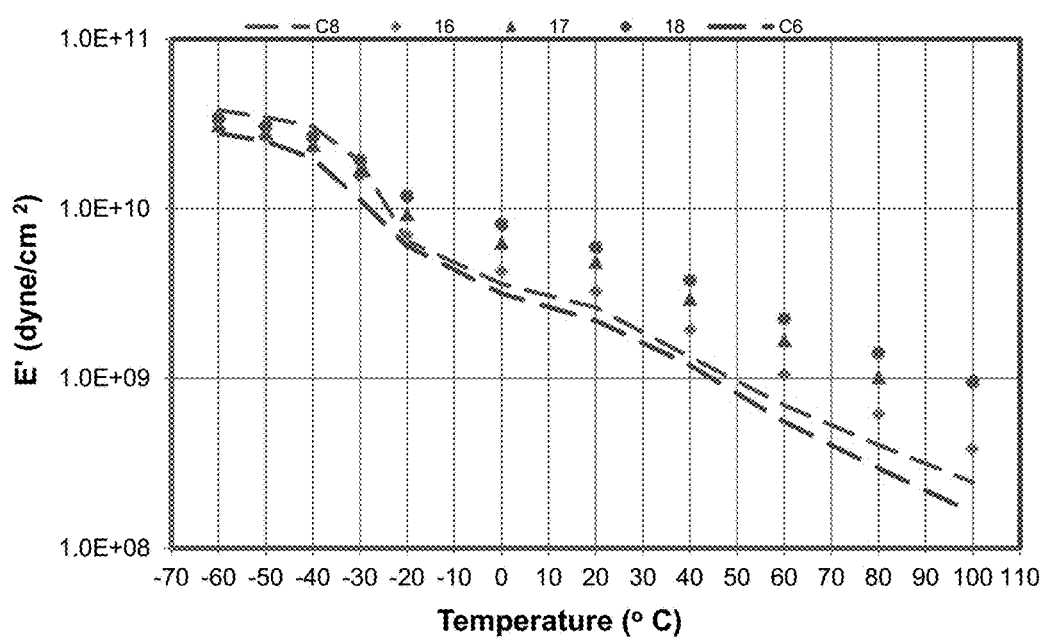
FIG. 5 illustrates the storage modulus (E') of Samples C6, C8, 16, 17, and 18.

FIG. 5 shows a plot of elastic modulus verses temperature for the formulations shown in Table 11. The inventive formulations 16 through 18 exhibits higher elastic modulus at elevated temperatures (80° C. to 100° C.) compared to comparative example C8 and C6 respectively. The higher modulus at elevated temperature is a desirable attribute to mitigate roll blocking during ware-house storage.

Certain embodiments and features have been described using a set of numerical upper limits and a set of numerical lower limits. It should be appreciated that ranges from any lower limit to any upper limit are contemplated unless otherwise indicated. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. A reactor blend composition comprising:
   (a) from about 70 wt % to about 95 wt % of a propylene-based elastomer,
   wherein the propylene-based elastomer has an ethylene content of about 15 wt % to about 30 wt % based upon the weight of the propylene-based elastomer, and
   (b) from about 5 wt % to about 30 wt % of an ethylene copolymer, where the ethylene-copolymer has an ethylene content of greater than or equal to about 70 wt % based upon the weight of the ethylene copolymer.

2. The composition of claim 1, wherein the propylene-based elastomer has an ethylene content of about 16 wt % to about 18 wt %, a melting temperature of less than 120° C., and a heat of fusion less than 75 J/g.

3. A membrane composition comprising:
   (a) from about 20 wt % to about 50 wt % of a polymer blend, comprising:
      (i) from about 70 wt % to about 95 wt % of a propylene-based elastomer, wherein the propylene-based elastomer has an ethylene content of about 15 wt % to about 30 wt % based upon the weight of the propylene-based elastomer, and (ii) from about 5 wt % to about 30 wt % of an ethylene copolymer, where the ethylene-copolymer has an ethylene content of greater than or equal to about 70 wt % based upon the weight of the ethylene copolymer;
- (b) from about 5 wt % to about 30 wt % of a thermoplastic resin based on the composition;
- (c) at least one flame retardant; and
- (d) at least one ultraviolet stabilizer.

4. The membrane of claim 3, wherein the polymer blend is a reactor blend of the propylene-based elastomer and the ethylene copolymer.

5. The membrane of claim 3, wherein the polymer blend is a physical blend of the propylene-based elastomer and the ethylene copolymer.

6. The membrane of claim 3, wherein the thermoplastic resin is a propylene homopolymer.

7. The membrane of claim 6, wherein the thermoplastic resin has a melt flow rate (230° C.; 2.16 kg) of greater than about 25 g/10 min.

8. The membrane of claim 3, wherein the thermoplastic resin is a propylene impact copolymer.

9. The membrane of claim 8, wherein the thermoplastic resin has a melt flow rate (230° C.; 2.16 kg) of less than about 5 g/10 min.

10. The membrane of claim 3, wherein the propylene-based elastomer has an ethylene content of from 16 to 18 wt % based upon the weight of the propylene-based elastomer.

11. The membrane of claim 3, wherein the thermoplastic resin is present in the composition in the amount of about 20 wt % to about 30 wt %.

12. The membrane of claim 3, wherein the propylene-based elastomer has a melting temperature of less than 120° C. and a heat of fusion of less than 75 J/g.

13. The membrane of claim 3, wherein the propylene-based polymer elastomer has an ethylene content of from 16 to 18 wt %, a melting temperature of less than 120° C., and a heat of fusion of less than 75 J/g.

14. The membrane of claim 3, wherein the propylene-based elastomer is a reactor blend of a first polymer component and a second polymer component, wherein the first polymer component has an ethylene content $R_1$ of from greater than 5 to less than 30 wt % α-olefin, where the percentage by weight is based upon the total weight of the first polymer component, and wherein the second polymer component has an ethylene content $R_2$ of from greater than 1 to less than 10 wt % α-olefin, where the percentage by weight is based upon the total weight of the second polymer component.

15. The membrane of claim 14, wherein the first polymer component has an α-olefin content $R_1$ of from 10 to 25 wt % α-olefin and the second polymer component has an α-olefin content $R_2$ of from greater than 2 to less than 8 wt % α-olefin.

16. The membrane of claim 3, wherein the blend composition has at least three of the following properties:
- (i) a storage modulus (E') at −40° C. of less than $2.5 \times 10^{10}$ dynes/cm$^2$;
- (ii) a storage modulus (E') at −30° C. of less than $1.5 \times 10^{10}$ dynes/cm$^2$;
- (iii) a storage modulus (E') at −20° C. of less than $5 \times 10^9$ dynes/cm$^2$;
- (iv) a storage modulus (E') at 0° C. of less than $2 \times 10^9$ dynes/cm$^2$;
- (v) a storage modulus (E') at 20° C. of less than $1.5 \times 10^9$ dynes/cm$^2$;
- (vi) a storage modulus (E') at 40° C. of greater than $6.5 \times 10^8$ dynes/cm$^2$;
- (vii) a storage modulus (E') at 60° C. of greater than $4 \times 10^8$ dynes/cm$^2$;
- (viii) a storage modulus (E') at 80° C. of greater than $2 \times 10^8$ dynes/cm$^2$; or
- (ix) a storage modulus (E') at 100° C. of greater than $1 \times 10^8$ dynes/cm$^2$.

17. The membrane of claim 3, where the blend composition comprises from about 10 to about 30 wt % of the flame retardant, based on the weight of the blend composition.

18. The membrane of claim 3, where the blend composition comprises from about 1 to about 20 wt % of the ultraviolet stabilizer, based on the weight of the blend composition.

19. A roofing composition comprising the membrane of claim 3.

* * * * *